(12) United States Patent
Pitigoi-Aron et al.

(10) Patent No.: US 9,990,330 B2
(45) Date of Patent: Jun. 5, 2018

(54) SIMULTANEOUS EDGE TOGGLING IMMUNITY CIRCUIT FOR MULTI-MODE BUS

(71) Applicant: QUALCOMM Incorporated, San Diego, CA (US)

(72) Inventors: Radu Pitigoi-Aron, San Jose, CA (US); Justin Black, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 14/925,612

(22) Filed: Oct. 28, 2015

(65) Prior Publication Data

US 2016/0124896 A1 May 5, 2016

Related U.S. Application Data

(60) Provisional application No. 62/072,395, filed on Oct. 29, 2014.

(51) Int. Cl.
*G06F 13/00* (2006.01)
*G06F 13/42* (2006.01)
*G06F 13/364* (2006.01)
*H04L 25/49* (2006.01)

(52) U.S. Cl.
CPC ........ *G06F 13/4291* (2013.01); *G06F 13/364* (2013.01); *G06F 13/4282* (2013.01); *H04L 25/4923* (2013.01)

(58) Field of Classification Search
CPC ................................................. G06F 17/30607
See application file for complete search history.

(56) References Cited

U.S. PATENT DOCUMENTS

| 4,779,073 | A | 10/1988 | Iketani |
| 6,530,029 | B1 | 3/2003 | Metchev |
| 6,574,233 | B1 | 6/2003 | Fuller, Jr. et al. |
| 8,898,358 | B2 | 11/2014 | Decesaris et al. |
| 8,948,209 | B2 | 2/2015 | Tailliet et al. |
| 2006/0246931 | A1 | 11/2006 | Kim |
| 2010/0064088 | A1* | 3/2010 | Stephens ............ G06F 13/4286 710/305 |

(Continued)

OTHER PUBLICATIONS

International Search Report and Written Opinion—PCT/US2015/058149—ISA/EPO—Jan. 26, 2016.

*Primary Examiner* — Henry Tsai
*Assistant Examiner* — Juanito Borromeo
(74) *Attorney, Agent, or Firm* — Loza & Loza LLP

(57) ABSTRACT

A device is provided comprising a shared bus including a first and a second line, a first subset of devices and a second subset of devices coupled to the shared bus. The first subset of devices may be configured to operate according to a first protocol mode. The second subset of devices may be configured to operate according to a second protocol mode, wherein the second protocol mode is distinct from the first protocol mode. A first device within the first subset of devices may include a receiver circuit adapted to adjust a signal transition occurring on the first line while the second line is in a first logical state so that the signal transition instead occurs when the second line is in a second logical state. The signal transition is adjusted only if it occurs within a threshold amount of time from a second transition on the second line.

29 Claims, 18 Drawing Sheets

(56) References Cited

U.S. PATENT DOCUMENTS

2015/0199295 A1   7/2015  Sengoku
2015/0234773 A1   8/2015  Sengoku
2015/0378959 A1*  12/2015 Jones .................. G06F 13/4291
                                            714/5.11

* cited by examiner

Assign each symbol transition a number: T

In CCIe system, there are 4 raw possible symbols; S=0, 1, 2, and 3

In any sequence of two raw symbols, same symbols can't appear
→ 3 possible cases per each transition Assign sequential index to each transition

| Previous symbol Ps | Current symbol Cs | Transition number T |
|---|---|---|
| 0 | 1 | 1 |
|   | 2 | 2 |
|   | 3 | 0 |
| 1 | 2 | 1 |
|   | 3 | 2 |
|   | 0 | 0 |
| 2 | 3 | 1 |
|   | 0 | 2 |
|   | 1 | 0 |
| 3 | 0 | 1 |
|   | 1 | 2 |
|   | 2 | 0 |

506

502 → TX: T to S

$T_{tmp} = T == 0 ? 3 : T$
$Cs = Ps + T_{tmp}$

504 → RX: S to T

$T_{tmp} = 4 + Cs - Ps$
$T = T_{tmp} == 3 ? 0 : T_{tmp}$

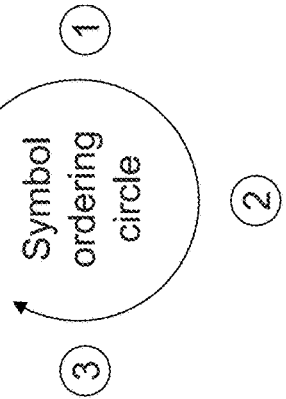

*FIG. 5*

```
always @ (SDA or SDAD or SCL or SCLD) begin
    SCLI = SCL & SCLD;
    if (~SCLD & SCL) begin
        SDAI = SDA;
    end
    else begin
        if (~(~SCLD & SCL)) begin
            SDAI = SDAD;
        end
        else begin
            SDAI = SDA | SDAD;
        end
    end
end
```

*FIG. 11*

SIMULTANEOUS EDGE TOGGLING IMMUNITY CIRCUIT FOR MULTI-MODE BUS

CLAIM OF PRIORITY

The present application for patent claims priority to provisional application No. 62/072,395 entitled "Simultaneous Edge Toggling Immunity Circuit for Multi-Mode Bus" filed Oct. 29, 2014, the entire disclosure of which is hereby expressly incorporated by reference.

FIELD

The present disclosure pertains to enabling efficient operations over a shared bus and, more particularly, facilitating coexistence of I2C devices along with devices employing ternary symbol coding on the same shared bus.

BACKGROUND

I2C (also referred to as I²C) is a multi-master serial single-ended bus used for attaching low-speed peripherals to a motherboard, embedded system, cellphone, or other electronic devices. The I2C bus is a two-line bus that includes a clock line (SCL) and data line (SDA) with 7-bit addressing. The bus has two roles for devices: master and slave. A master device is a device that generates the clock and initiates communication with slave devices. An I2C-compatible slave device is a device that receives the clock and responds when addressed by the master. The I2C bus is a multi-master bus which means any number of master devices can be present. Additionally, master and slave roles may be changed between messages (after a STOP is sent). I2C defines basic types of messages, each of which begins with a START and ends with a STOP.

In a second mode of operation, the same two-line bus may be reused for data transmission while by transmitting ternary-coded symbols on both lines and embedding a clock within guaranteed symbol-to-symbol transitions. Under certain conditions, the transmission of ternary-coded symbols may be erroneously detected by I2C devices as an I2C code.

Consequently, a solution is needed to permit the coexistence of I2C devices and ternary symbol coding devices over a shared bus.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a device is provided comprising a shared bus (including a first line and a second line), a first subset of devices coupled to the shared bus, and a second subset of devices coupled to the shared bus. The first subset of devices may be configured to operate according to a first protocol mode over the shared bus. Similarly, the second subset of devices may be configured to operate according to a second protocol mode over the shared bus, wherein the second protocol mode is distinct from the first protocol mode. A first device within the first subset of devices may include a receiver circuit adapted to adjust a signal transition occurring on the first line while the second line is in a first logical state so that the signal transition instead occurs when the second line is in a second logical state opposite the first logical state. The signal transition may be adjusted only if it occurs within a threshold amount of time from a second transition on the second line. If the signal transition on the first line occurs more than the threshold amount of time from the second transition on the second line while the second line is in the second logical state, the receiver circuit may be further adapted to maintain the signal transition on the first line while the second line is in the second logical state.

The receiver circuit may include a combinational logic circuit and one or more line delays that are adapted to provide a first delayed signal of a first signal on the first line and a second delayed signal of a second signal on the second line. At least one of the first signal or the second signal may be a signal generated by one or more devices in the second subset of devices accessing the shared bus. For instance, at least one of the first signal or the second signal may be a signal generated while the shared bus is operating according to the second protocol mode.

The signal transition on the first line while the second line is the first logical state may be interpreted as a Start or Stop condition within the first protocol mode if the transition occurs more than a threshold amount of time from the second transition on the second line.

In one example, in the first protocol mode the first line is used for data transmissions and the second line is used to transmit a clock signal, in the second protocol mode, both the first line and the second line are used for data transmissions encoded within symbols while a clock signal is embedded in symbol-to-symbol transitions.

The first subset of devices may listen on the shared bus while the second protocol mode is used on the shared bus.

In one example, the first subset of devices may include I2C-compatible devices.

In another example, a second device within the second subset of devices is adapted to: (a) convert a sequence of data bits into a plurality of in transition numbers; (b) convert each transition number into a sequential number from a set of sequential numbers; (c) convert the sequential number into a raw symbol; and/or (d) transmit the raw symbol via a plurality of differential drivers and spread over the first line and the second line, wherein the clock signal is effectively embedded in the transmission of raw symbols since the conversion from transition number into a sequential number guarantees that no two consecutive raw symbols are the same.

Another aspect provides a method operational in a device for facilitating multi-mode bus operations while inhibiting unintended commands from being recognized. A shared bus, including a first line and a second line, is provided. A first subset of devices are coupled to the shared bus, wherein devices in the first subset of devices are configured to operate according to a first protocol mode over the shared bus. Similarly, a second subset of devices are coupled to the shared bus, wherein devices in the second subset of devices are configured to operate according to a second protocol mode over the shared bus, wherein the second protocol mode is distinct from the first protocol mode. A first device, within the first subset of devices, may be provisioned with a receiver circuit adapted to adjust a signal transition occurring on the first line while the second line is in a first logical state so that the signal transition instead occurs when the second line is in a second logical state opposite the first logical state, wherein the signal transition is adjusted only if it occurs within a threshold amount of time from a second transition on the second line.

Another example provides a receiver device, comprising a first line, a second line, and a combinational logic circuit. The first line delay may be to couple to a first line of a shared bus to delay a first signal. The second line may be delay to couple to a second line of the shared bus to delay a second signal, where the second line delay is longer than the first line delay. The combinational logic circuit may be adapted to: (a) receive a first delayed signal from the first line delay and a second delayed signal from the second line delay; and/or (b) adjust a signal transition occurring on the first line while the second line is in a first logical state so that the signal transition instead occurs when the second line is in a second logical state, wherein the signal transition is adjusted only if it occurs within a threshold amount of time from a second transition on the second line.

If the signal transition occurs within the threshold amount of time from the second transition on the second line and the second line is the first logical state, the combinational logic circuit may be adapted to provide a first output signal on a first output line in which the signal transition occurs while a second output signal on a second output line is in the second logical state.

If the signal transition on the first line occurs more than the threshold amount of time from the second transition on the second line while the second line is in the second logical state, the combinational logic circuit may be farther adapted to maintain the signal transition on the first line while the second line is in the second logical state.

A method operational on a receiver device is provided for facilitating multi-mode bus operations while inhibiting unintended commands from being recognized. A first delayed signal may be received from a first line delay coupled to a first line and a second delayed signal from a second line delay coupled to the second line, where the second line delay is longer than the first line delay. A signal transition, occurring on the first line while the second line is in a first logical state, is adjusted so that the signal transition instead occurs when the second line is in a second logical state opposite the first logical state. The signal transition is adjusted only if it occurs within a threshold amount of time from a second transition on the second line.

In the first protocol mode, the first line may be used for data transmissions and the second line is used to transmit a clock signal, and in the second protocol mode both the first line and the second line are used for data transmissions encoded within symbols while a clock signal is embedded in symbol-to-symbol transitions.

DRAWINGS

Various features, nature, and advantages may become apparent from the detailed description set forth below when taken in conjunction with the drawings in which like reference characters identify correspondingly throughout.

FIG. 5 illustrates the conversion between transition numbers and sequential symbols.

FIG. 11 illustrates exemplary Verilog code for implementing the combinational logic circuit of FIG. 10.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures, and techniques may not be shown in detail in order not to obscure the embodiments.

Overview

According to one aspect, a shared bus may be dynamically switched between a first mode (e.g., I2C mode) and a second mode (e.g., ternary mode) to support different types of devices. While the bus operates in the second mode, I2C-compatible devices coupled to the shared bus listen/receive signals from the shared bus. While in ternary mode, most signals are ignored by the I2C-compatible devices. However, due to simultaneous toggling of both lines of the shared bus and propagation delays, there is possibility that certain signals in ternary mode may be misinterpreted by I2C-compatible devices as valid I2C signals.

To prevent an I2C-compatible device from erroneously detecting a Start/Stop condition on a shared bus, a receiver circuit is provided comprising delay lines and a combinational logic circuit. A first line delay may serve to receive a first signal on a first line and output a first delayed signal. A second line delay may serve to receive a second signal on a second line and output a second delayed signal. The combinational logic circuit may be adapted to (a) receive the first delayed signal from the first line delay and the second delayed signal from the second line delay, and/or (b) adjust a signal transition occurring on the first line while the second line is HIGH so that the signal transition instead occurs when the second line is LOW, wherein the signal transition is adjusted only if it occurs within a threshold amount of time from a HIGH-to-LOW or LOW-to-HIGH transition on the second line. Note that HIGH and LOW describe two different states or levels of a line.

If the signal transition occurs more than the threshold amount of time from a HIGH-to-LOW transition or LOW-to-HIGH on the second line, the combinational logic circuit may be further adapted to maintain the signal transition on the first line within the same state as it originally occurred on the second line. For instance, if the first line (SDA) toggles outside the threshold amount of time relative to the toggling of the second line (SCL), then the combinational circuit preserves the time relationship between the two signals. That is, if the SDA line toggled while the SET line is LOW, the resultant toggling on the SDA line will stay on the same period while the SCL line is LOW. And symmetrically, if the SDA line toggled while the SCL line was HIGH, the resulting transition of the SDA line will be kept within the HIGH period of the SCL line.

Exemplary Operating Environment

Figure 1:
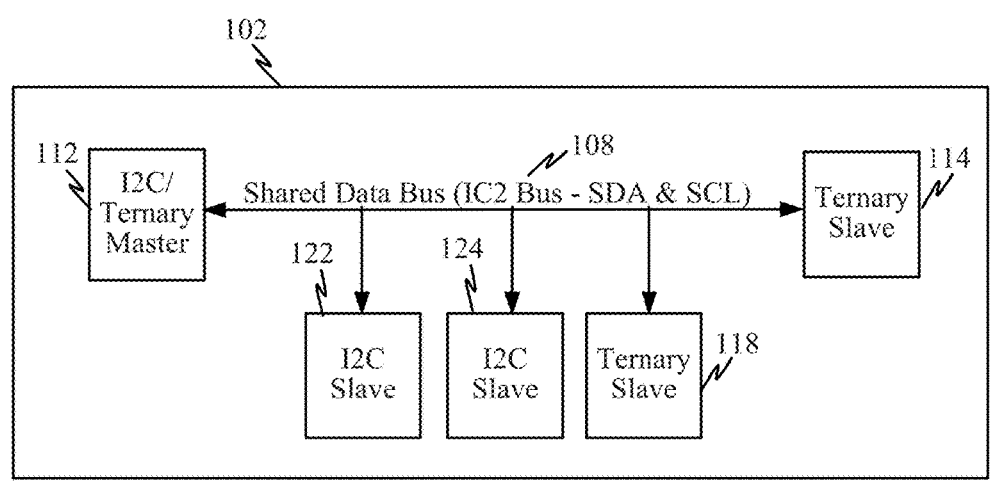
FIG. 1 is a block diagram illustrating a device 102 having a multi-mode shared data bus 108.

FIG. 1 is a block diagram illustrating a device 102 having a multi-mode shared data bus 108. In one example, the shared data bus 108 may be an I2C bus comprising two wires, a clock line (SCL) and a serial data line (SDA). In I2C mode, the clock line SCL may be used to send a clock used to synchronize all data transfers over the I2C bus (shared data bus 108). The data line SDA and clock line SCL are coupled to all devices on the I2C bus (shared data bus 108). In this example, data may be exchanged between a master device 112 and a plurality of I2C slave devices 122 and/or 124 via the shared data bus 108.

According to one aspect, an improved mode of operation (e.g., with shared data bus 108 transmission frequencies greater than 1 MHz) may be implemented over the multi-mode shared data bus 108. This improved mode of operation over an I2C bus may be referred to as a ternary mode. In ternary mode, the SCL line and the SDA line may both be used to transmit data while a clock is embedded symbol to symbol transitions over the two lines. In this example, the master device 112 and slave devices 114 and/or 118 may operate according to the ternary mode over the shared data bus 108 without affecting the proper operation of other I2C devices 122 and/or 124. According to one aspect, this improved mode over the shared data bus 108 may be implemented without any bridge device between ternary devices and I2C slave devices.

A protocol is provided that permits I2C-compatible devices 114 and 118 and ternary-compatible devices 122 and 124 to be concurrently coupled to the shared data bus 108. The shared data bus 108 may dynamically switch between operating according to distinct communication protocols (e.g., I2C mode and ternary mode). As previously noted, communications and/or access to the shared data bus 108 may be managed by the multi-mode master device 112. The master device 112 transmits an entry call to indicate that the shared data bus 108 is to switch its communication protocol from a first protocol mode (e.g., I2C mode) to a second protocol mode (e.g., ternary mode). Similarly, the master device 112 transmits an exit call to indicate that the shared data bus 108 is to switch its communication protocol from the second protocol mode (e.g., ternary mode) to the first protocol mode (e.g., I2C mode). The slave devices 114, 118, 122, 124 coupled to the shared bus 108 monitor for these entry and exit calls to ascertain when they may operate on the shared bus 108.

Exemplary Ternary Encoding Technique

Figure 2:
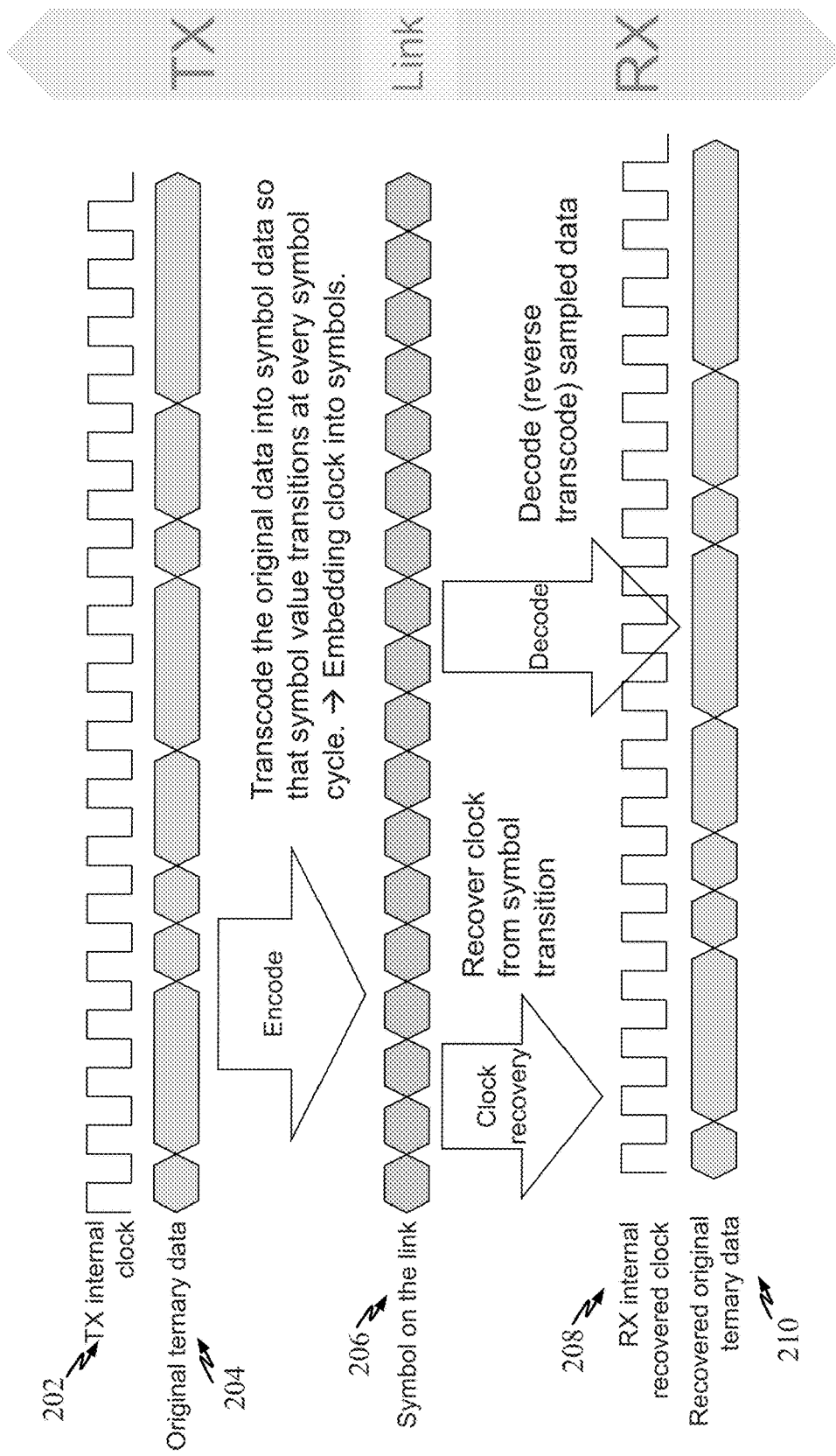
FIG. 2 illustrates how a clock may be embedded within symbol to symbol transitions in ternary mode, thereby allowing the use of the two lines (i.e., SDA line and SCI, line) of an I2C bus for data transmissions.

FIG. 2 illustrates how a clock may be embedded within symbol to symbol transitions in ternary mode, thereby allowing the use of the two lines (i.e., SDA line and SCL line) of an I2C bus for data transmissions. In one example, this embedding of the clock may be achieved by transition clock transcoding. For instance, the data 204 to be transmitted over the physical link (wires) is transcoded so that transmitted symbols are guaranteed to change state at every symbol cycle or transition of the transmitted symbols 206. In one example, sequences of bits are converted into a ternary number, and each digit of the ternary number is converted into a symbol for transmission. Sequential symbols are guaranteed to be different even when two sequential digits of the ternary number are the same. Consequently, the original clock 202 can be embedded in the change of symbol states at every symbol cycle. A receiver recovers clock information 208 from the state transition at each symbol (in the transmitted symbols 206) and then reverses the transcoding of the transmitted symbols 206 to obtain the original data 210. In one example, each symbol is converted into a digit, a plurality of digits making up a ternary number, where the ternary number is then converted into a plurality of bits. Consequently, the original clock 202 can be embedded in the change of symbol states at every symbol cycle. This allows both wires of the I2C bus (shared data bus 108 in FIG. 1, SDA line and SCL line) to be used to send data information. Additionally, the symbol rate can be doubled since it is no longer necessary to have a setup and hold time between clock and data signals.

Figure 3:
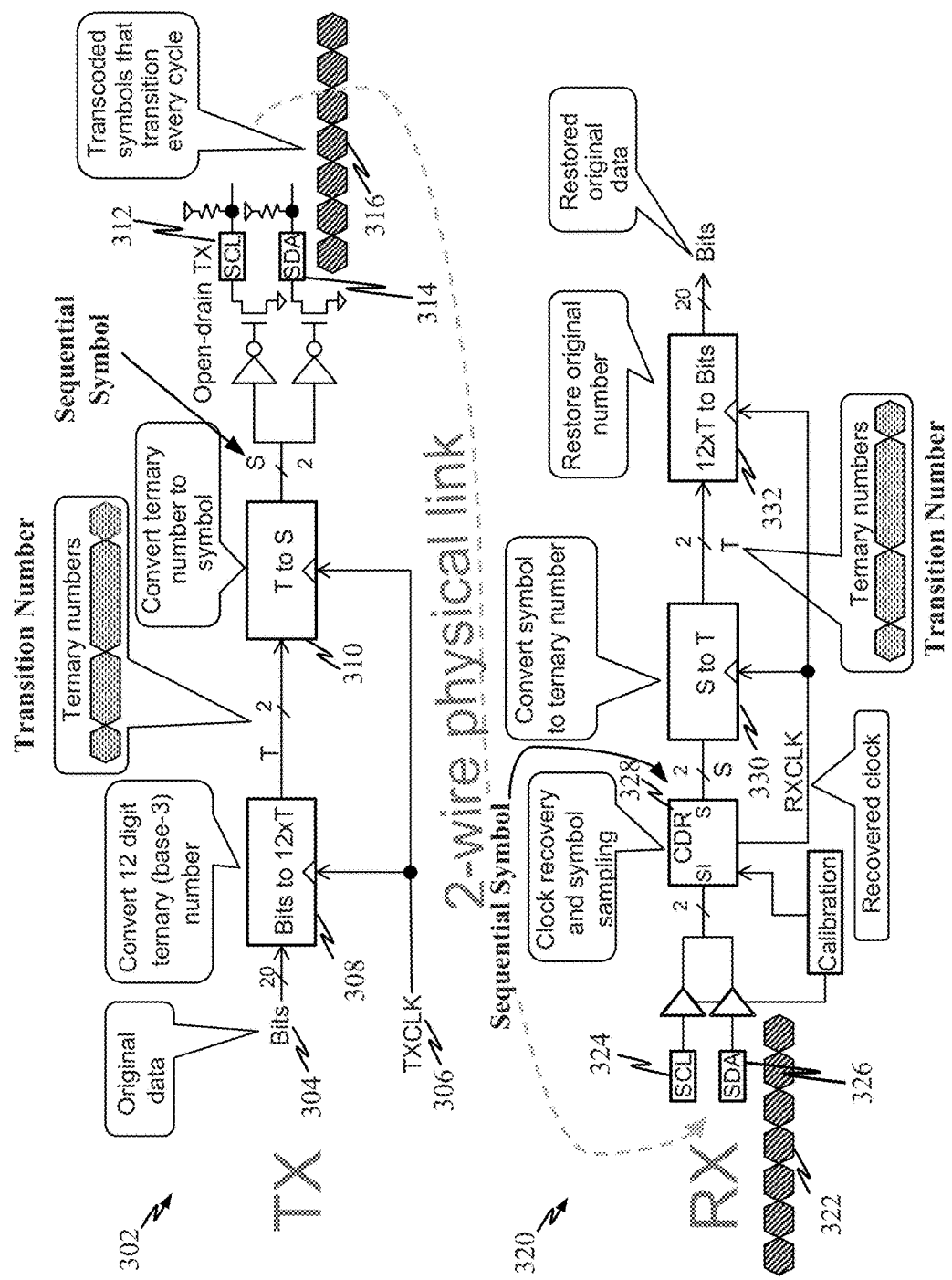
FIG. 3 is a block diagram illustrating an exemplary method for transcoding of data bits into transcoded symbols at a transmitter to embed a clock signal within the transcoded symbols.

FIG. 3 is a block diagram illustrating an exemplary method for transcoding of data bits into transcoded symbols at a transmitter to embed a clock signal within the transcoded symbols. At the transmitter 302, a sequence of data bits 304 are converted into a ternary (base 3) number (i.e., a "transition number"), and the ternary numbers are then converted into (sequential) symbols which are transmitted over the clock line SCL 312 and the data line SDA 314.

In one example, an original 20 bits of binary data is input into a bit-to-transition number converter block 308 to be converted to a 12-digit ternary number. Each digit of a 12-digit ternary number represents a "transition number". Two consecutive transition numbers may have be the same numbers (i.e., consecutive digits of the ternary number may be the same). Each transition number is converted into a sequential symbol at a transition-to-symbol block 310 such that no two consecutive sequential symbols have the same values. Because a transition is guaranteed at every sequential symbol, such sequential symbol transition may serve to embed a clock signal. Each sequential symbol 316 is then sent over a two wire physical link (e.g., I2C bus comprising a SCL line 312 and a SDA line 314).

Figure 4:
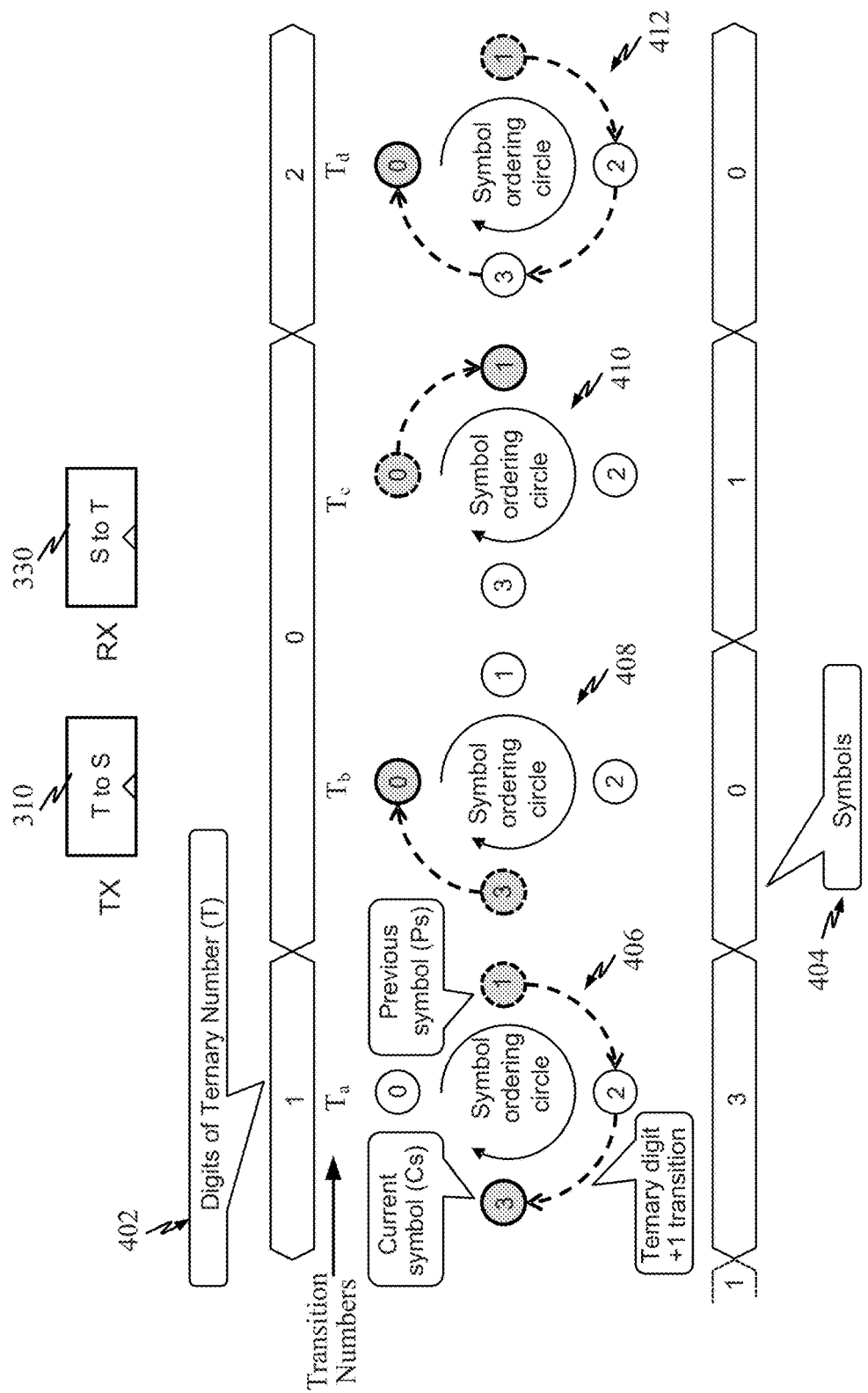
FIG. 4 illustrates an exemplary conversion between transition numbers and sequential symbols.

FIG. 4 illustrates an exemplary conversion between transition numbers 402 and sequential symbols 404. An individual digit of ternary number, base-3 number, also referred to as a transition number, can have one of the three (3) possible digits or states, 0, 1, or 2. While the same digit may appear in two consecutive digits of the ternary number, no two consecutive sequential symbols have the same value. The conversion between a transition number and a sequential symbol guarantees that the sequential symbol always changes (from sequential symbol to sequential symbol) even if consecutive transition numbers are the same.

The conversion function is set forth illustratively in FIG. 5. On the transmitter side (TX: T to S) 502, a transition number (T) may be converted to a sequential symbol (S). For instance, a current sequential symbol (Cs) may be obtained based on a previous sequential symbol (Ps) and a temporary transition number ($T_{tmp}$) that is a function of a current transition number (T). The temporary transition number ($T_{tmp}$) may be obtained by comparing the current transition number T to zero and when T=zero, the temporary transition number ($T_{tmp}$) becomes equal to 3, else (when not equal zero) $T_{tmp}$ becomes equal to T (i.e., $T_{tmp}$=T=0?3:T). The current sequential symbol may be obtained as a sum of the current sequential symbol ($C_s$) plus the previous sequential symbol ($P_s$) plus the temporary transition number ($T_{tmp}$) (i.e., $C_s=P_s+T_{tmp}$).

On the receiver side (RX: S to T) 504 the conversion operation is reversed to obtain a transition number from a current sequential symbol (Cs) and a previous sequential symbol (Ps). A temporary transition number ($T_{tmp}$) may be obtained as the sum of the current sequential symbol (Cs) plus 4 minus the previous symbol (Ps) (i.e., $T_{tmp}=C_s+4-P_s$). The current transition number (T) is equal to the temporary transition number ($T_{tmp}$), but the temporary transition number ($T_{tmp}$) is compared to three (3) and when $T_{tmp}$=3, the temporary transition number ($T_{tmp}$) becomes equal to zero (0), else (when $T_{tmp}$ not equal 3) T becomes equal to $T_{tmp}$ (i.e., T=$T_{tmp}$=3?0:T).

A table 506 illustrates the conversion between transition numbers and sequential symbols.

Referring again to FIG. 4, an example of the conversion between transition numbers and sequential symbols is illustrated therein. For example, in a first cycle 406, the current transition number (Ta) is 2, so $T_{tmp}$ is also 2, and with the previous sequential symbol $P_s$ being 1, the new current sequential symbol $C_s$ is now 3.

In a second cycle 408, the transition number (Tb) is 1. Since the transition number (Tb) is not equal to zero, the temporary transition number T is equal to the transition number (Tb) value of 1. The current sequential symbol (Cs) is obtained by adding the previous sequential symbol (Ps) value of 3 to the temporary transition number $T_{tmp}$ of 1. Since the result of the addition operation equals 4, which is greater than 3, the rolled over number 0 becomes the current sequential symbol (Cs).

In a third cycle 410, the current transition number (T) is 1. Because the transition number T is 1, the temporary transition number $T_{tmp}$ is also 1. The current sequential symbol (Cs) is obtained by adding the previous sequential symbol (Ps) value of 0 to the temporary transition number $T_{tmp}$ of 1. Since the result of the addition operation equals 1, which is not greater than 3, the current symbol (Cs) is equal to 1.

In a fourth cycle 412, current transition number (T) is 0. Because the transition number T is 0, the temporary transition number $T_{tmp}$ is 3.

The current sequential symbol (Cs) is obtained by adding the previous sequential symbol (Ps) value of 1 to the temporary transition number $T_{tmp}$ of 3. Since the result of the addition operation is 4, which is greater than 3, the rolled over number 0 becomes the current sequential symbol (Cs).

Note that even if two consecutive ternary digits Tb and Tc have the same numbers, this conversion guarantees that two consecutive sequential symbols have different state values. Because of this, the guaranteed transition in the sequential symbols 404 may serve to embed a clock signal, thereby freeing the clock line SCL in an I2C bus for data transmissions.

Referring again to FIG. 3, at the receiver 320 the process is reversed to convert the transcoded symbols back to bits and, in the process, a clock signal is extracted from the symbol transition. The receiver 320 receives a sequence of sequential symbols 322 over the two wire physical link (e.g., I2C bus comprising a SCL line 324 and a SDA line 326). The received sequential symbols 322 are input into a clock-data recovery (CDR) block 328 to recover a clock timing and sample the transcoded symbols (S). A symbol-to-transition number converter block 330 then converts the transcoded (sequential) symbols to a transition number, i.e., one ternary digit number. Then, a transition number-to-bits converter 332 converts 12 transition numbers to restore 20 bits of original data from the 12 digit ternary number.

The example illustrated in FIGS. 3 and 4 for a 2-wire bus and 12 transition numbers may be generalized to an n-wire system and m transition numbers. If there are r possible symbol transition states per one T, T0 to Tm−1, m transitions can send $r^m$ different states, i.e., $r=2^n-1$. Consequently, transitions T0 . . . Tm−1 contain data that can have $(2^n-1)^m$ different states.

This technique illustrated herein may be used to increase the link rate of a shared data bus 108 (FIG. 1) beyond what the I2C standard bus provides and is referred hereto as ternary mode. In one example, a master device and/or a slave device coupled to the shared data bus 108 may implement transmitters and/or receivers that embed a clock signal within symbol transmissions (as illustrated in FIGS. 2, 3, 4, and 5) in order to achieve higher bit rates over the same shared data bus than is possible using a standard I2C bus.

Exemplary I2C Transmissions Ternary Transmissions Over Shared Bus

Figure 6:
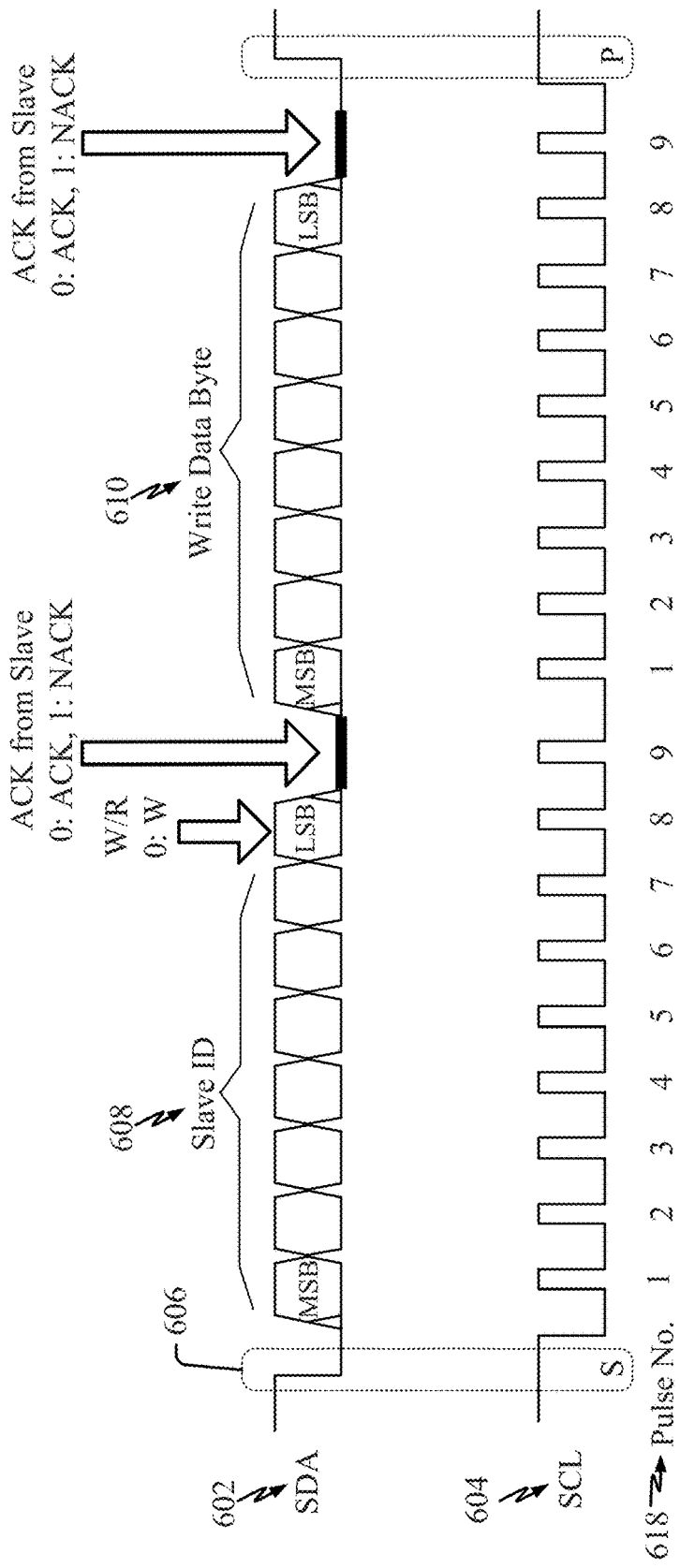
FIG. 6 illustrates an exemplary timing diagram of an I2C one byte write data operation.

FIG. 6 illustrates an exemplary timing diagram of an I2C one byte write data operation. In this example, the shared control data bus 108 (FIG. 1) includes a serial data line SDA 602 and a serial clock line SCL 604. The transmission scheme illustrated in FIG. 6 may be referred to as "I2C mode". The SCL line 604 is used to send a clock from the master device to all slave devices while the SDA line 602 transmits data bits. An I2C master device sends a 7-bit slave ID 608 in the SDA line 602 to indicate which slave device on the I2C bus the master device wishes to access, then one bit to indicate a write operation. Only the slave device whose ID matches with the 7-bit slave ID 608 can cause intended actions. In order for an I2C slave device to detect its own ID, the master device has to send at least 8-bits on the SDA line (or 8 clock pulses on the SCL line 604).

The I2C standard requires that all I2C compatible slave devices reset their bus logic on receipt of a START condition 606 (e.g., indicated by a HIGH-to-LOW transition on the SDA line while the SCL line is HIGH).

The ternary protocol uses both the SDA line 602 and the SCL line 604 for data transmissions while embedding a clock signal within the data transmissions. For example, data bits may be transcoded into a plurality of symbols which are then transmitted over lines. By embedding the clock signal (SCL line for I2C bus in FIG. 6) within symbol transitions, both the SDA line 602 and SCL line 604 may be used for data transmission.

Figure 7:
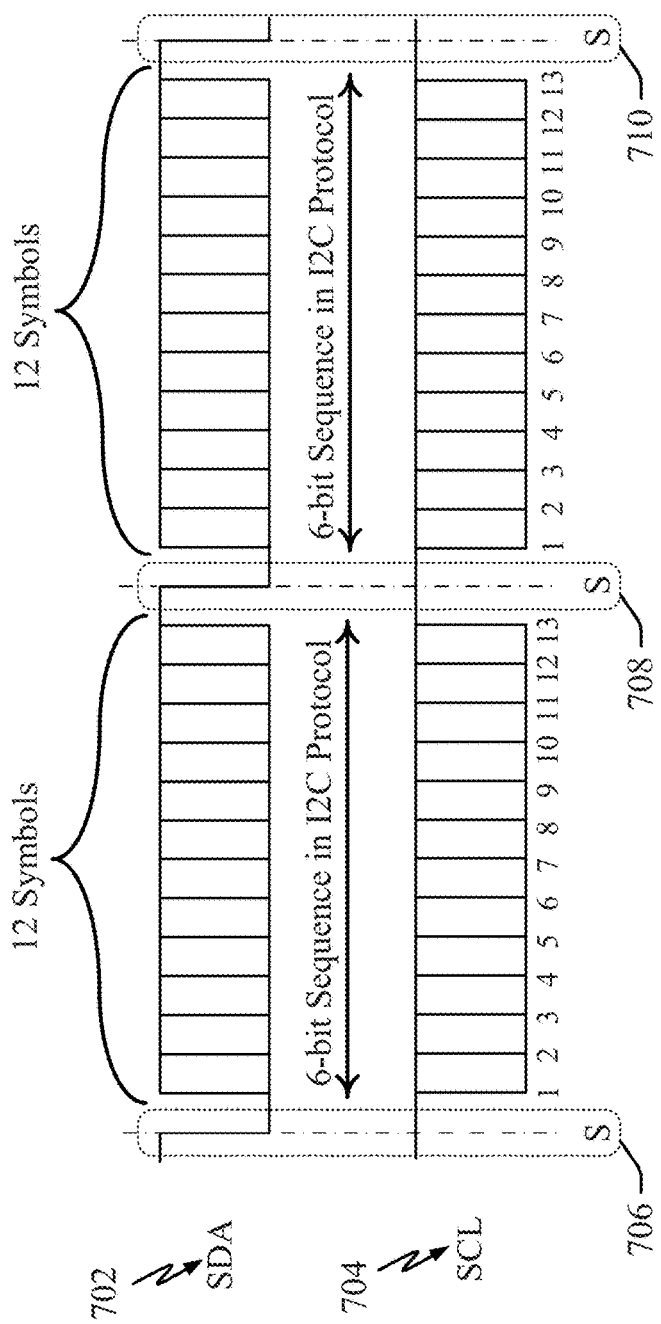
FIG. 7 illustrates an exemplary ternary transmission in which data bits have be transcoded into twelve symbols for transmission over the SDA line and the SCL line.

FIG. 7 illustrates an exemplary ternary transmission in which data bits have be transcoded into twelve symbols for transmission over the SDA line 702 and the SCL line 704. The transmission scheme illustrated in FIG. 7 may be referred to as "ternary mode". Ternary mode is source synchronous, driven by push-pull drivers. Whoever sends out data over the shared control data bus also sends out clock information embedded in the data (e.g., within the symbol-to-symbol transitions). Consequently, only one device on the control data bus is allowed to drive the share control data bus at any one time.

In order to support both legacy I2C devices and ternary devices over the same bus, ternary mode operations use the same START condition 706, 708, 710, which prevents legacy I2C slave devices from reacting to any ternary operations (e.g., the Start condition during ternary mode causes the legacy I2C slave devices to reset). In this example, the START condition 706, 708, 710 (i.e., indicated by a HIGH-to-LOW transition on the SDA, line 702 while the SCL line 704 is HIGH) is detected before a full slave ID (i.e., a full 7 bits) is transmitted, therefore this is an incomplete slave ID (less than 7 bits). If a master device sends 6 SCL pulses then issues a START condition 706, 708, 710, then all legacy I2C slave devices reset their bus logic before they recognize the data as an I2C Slave ID. Since the 6-bit sequences (e.g., corresponding to every two symbols) are sent between two START conditions 706, 708, 710, these 6-bit sequences are not decoded as a valid slave ID by any I2C slave device. Consequently, legacy I2C slave devices will not act upon the incomplete Slave IDs.

Exemplary I2C Receiver Circuit

In I2C mode, a transition (e.g., LOW-to-HIGH or HIGH-to-LOW) on the SDA line while the SCL line is HIGH is understood to be a control signal. A transition on the SDA line while the SCL line is LOW is ignored. The data is read while the SCL line is stable HIGH and the SDA line is stable either LOW or HIGH. In order to avoid a change in an I2C device's behavior towards the shared bus, it is necessary to avoid unwanted bus management control states, namely the SDA line changing while SCL line is HIGH.

While operating in ternary mode, there is a possibility that a ternary device may toggle one or both lines simultaneously. On physical implementations, the simultaneous toggling of lines could reach I2C devices on the shared bus at slightly different moments, such that they could be interpreted as the SDA line toggling while the SCL line is HIGH. This particular situation must be avoided in the ternary protocol in order to prevent I2C devices from interpreting them as an I2C signal.

Figure 8:
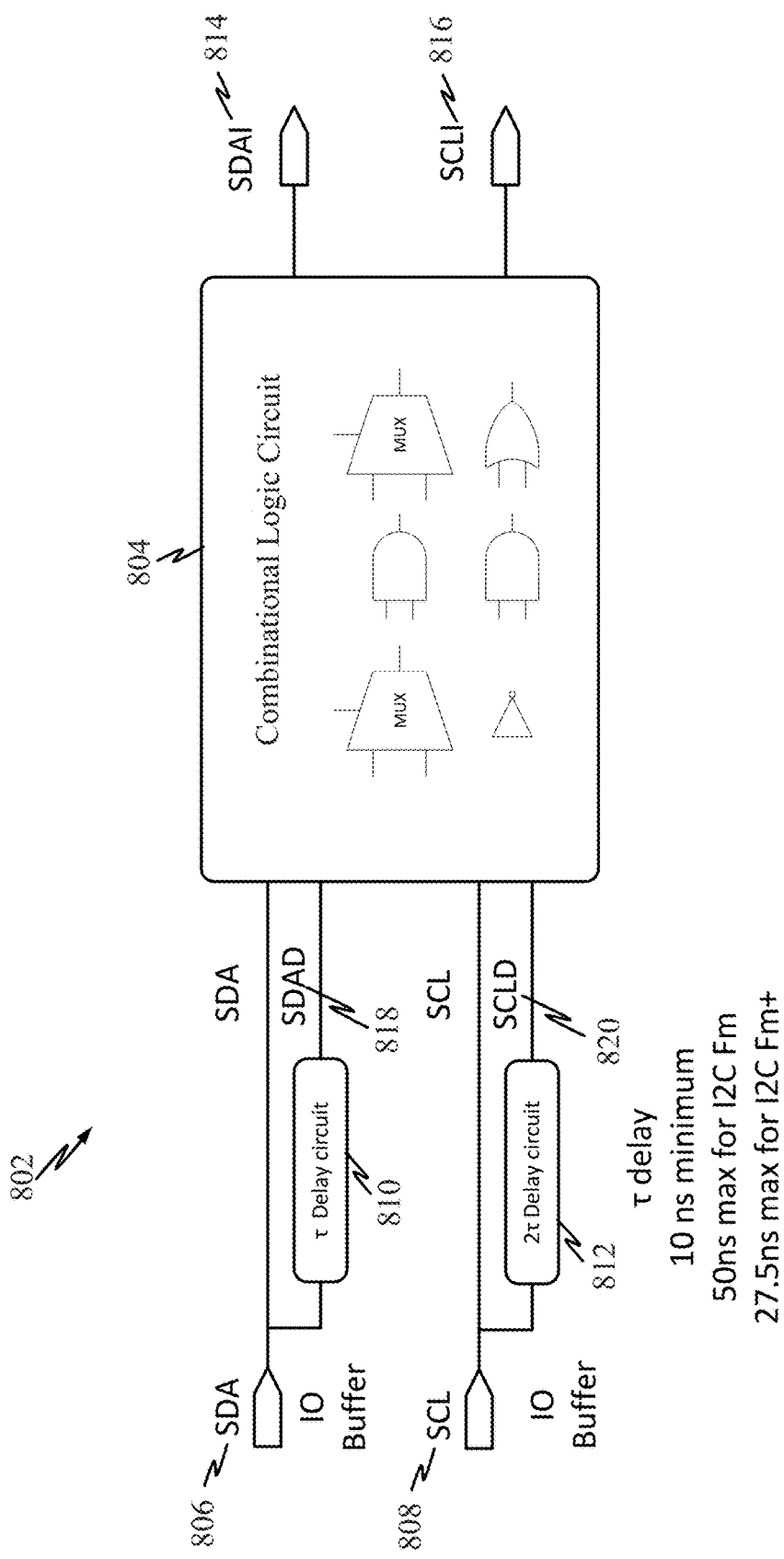
FIG. 8 is a block diagram illustrating part of receiver circuit for an I2C device that serves to prevent misreading of signals on a shared bus as valid I2C signals.

FIG. 8 is a block diagram illustrating part of receiver circuit 802 for an I2C device that serves to prevent misreading of signals on a shared bus as valid I2C signals. An SDA line 806 of a shared data bus may be coupled to a first delay circuit 810, and the signals SDA and SDAD are both sent to a combinational logic circuit 804. Similarly, an SCL line 808 of the shared data bus may be coupled to a second delay circuit 812, and the signals SCL and SCLD are both sent to the combinational logic circuit 804. The second delay circuit 812 may implement a longer delay than the first delay circuit 810. The combinational logic circuit 804 may be configured to operate without the need for an external clock by delaying and filtering the signals on the SDA line 806 and/or SCL line 808 to prevent misreading of the signals thereon by an I2C device. The outputs SDAI 814 and SCLI 816 of the combinational logic circuit 804 may be sent to the I2C device to which the receiver circuit 802 is coupled.

Note that FIG. 8 indicates an exemplary first delay of for the first delay circuit 810 and a second delay of 2τ for the second delay circuit. However, these time delays may be adjusted or modified for each particular implementation.

Figure 9:
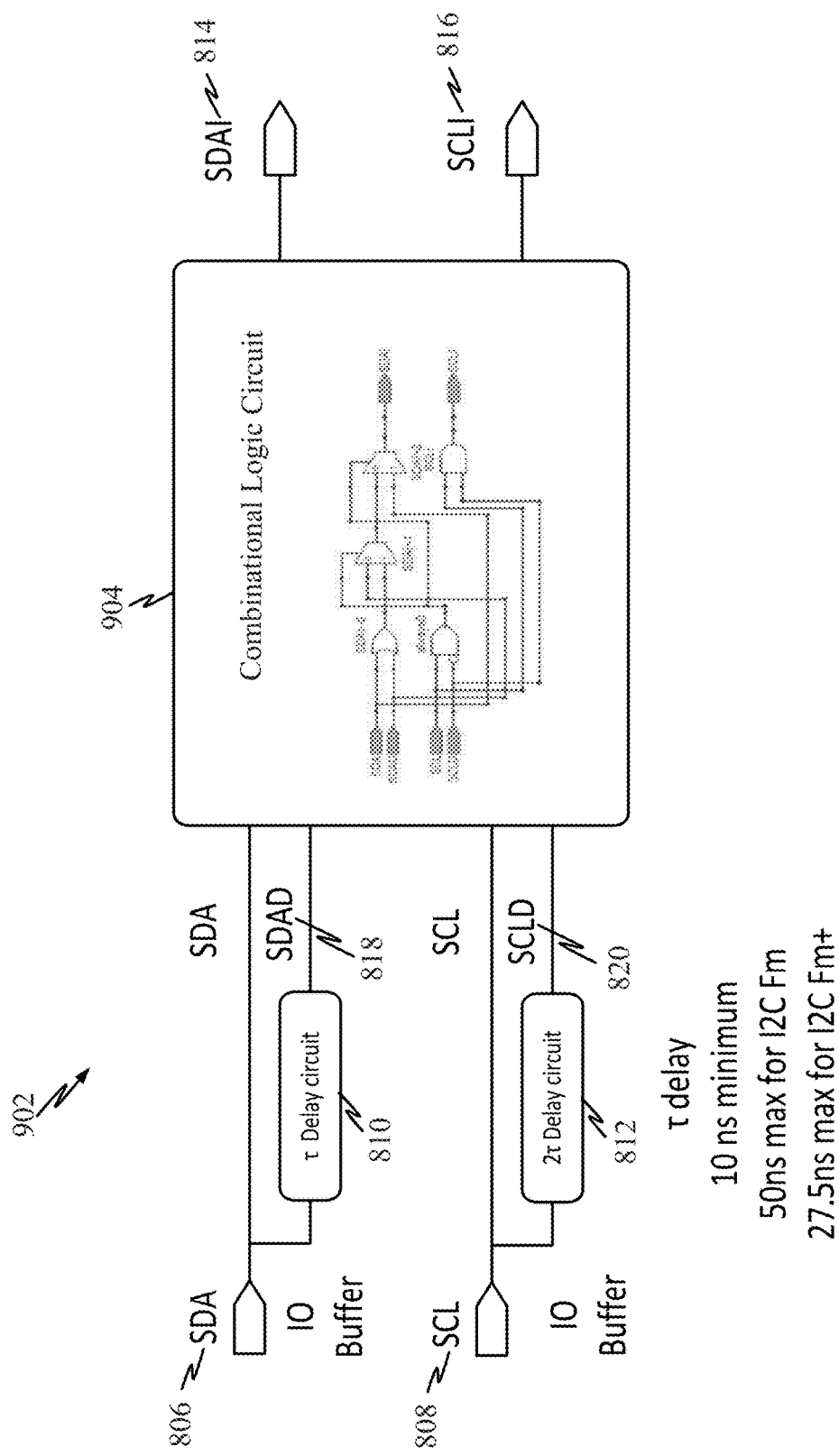
FIG. 9 is a block diagram illustrating one example of the receiver circuit of FIG. 8.

FIG. 9 is a block diagram illustrating one example of the receiver circuit 802 of FIG. 8. In this example, one example of the combinational circuit 904 is illustrated.

Figure 10:
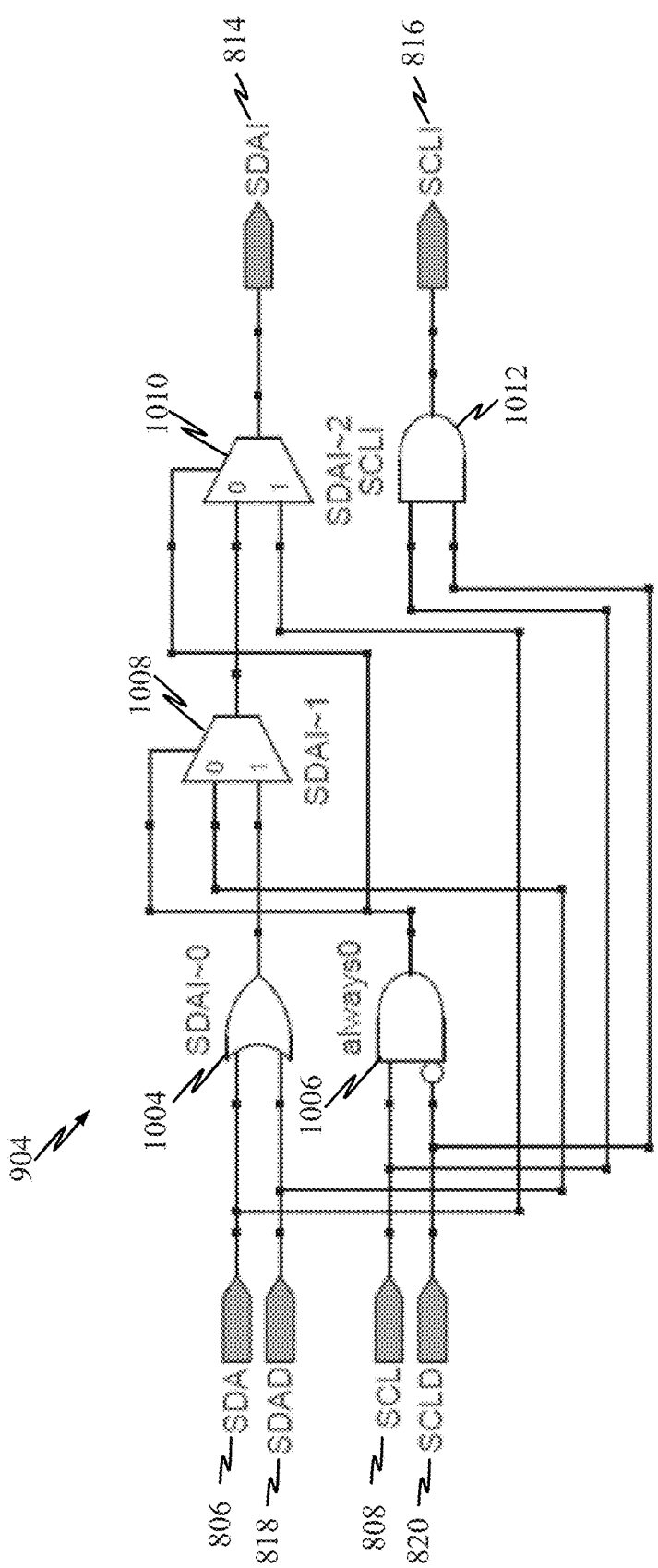
FIG. 10 illustrates the combinational circuit of FIG. 9.

FIG. 10 illustrates the combinational circuit 904 of FIG. 9. The SDA line 806 is coupled to a XOR gate 1004 and a first multiplexer 1010. The SDAD line 818 is coupled to the XOR gate 1004 and a second multiplexer 1008. The SCL line 808 is coupled to a first AND gate 1006 and a second AND gate 1012. The SCLD line 820 is coupled to the first AND gate 1006 and the second AND gate 1012.

An output of the XOR gate 1004 serves as in input to the second multiplexer 1008. An output of the AND gate 1006 serves to select the first multiplexer 1010 and second multiplexer 1008. An output of the second multiplexer 1008 serves as an input to the first multiplexer 1010. The output SDAI 814 of the first multiplexer 1010 serves as an input to a corresponding I2C device. The output SCLI 816 of the second AND gate 1012 also serves as an input to the corresponding I2C device.

FIG. 11 illustrates exemplary Verilog code for implementing the combinational logic circuit 1604 of FIG. 10.

Figure 12:
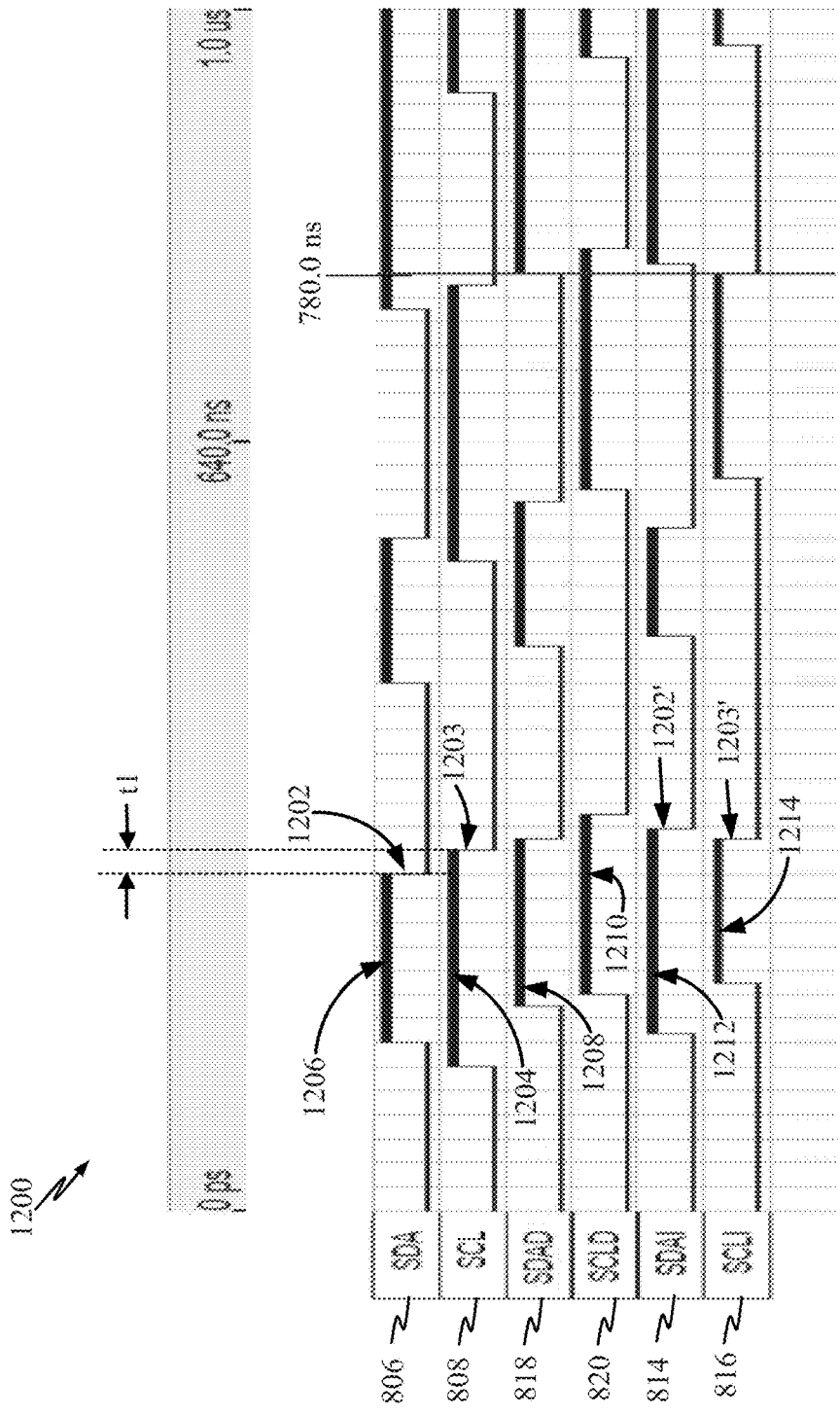
FIG. 12 illustrates a first timing diagram of the SDA line transition while the SCL line is HIGH and the corresponding outputs SDAI and SCLI from the receiver circuit of FIG. 8.

FIG. 12 illustrates a first timing diagram 1200 of the SDA line 806 transition while the SCL line 808 is HIGH and the corresponding outputs SDAI 814 and SCLI 816 from the receiver circuit of FIG. 8. In this example, a first signal 1206 (on the SDA line 806) has a first transition 1202 (e.g., from a first logical state to a second logical state, or from HIGH to LOW) on the SDA line 806 that occurs while a second signal 1204 on the SCL line 808 is in a second logical state (e.g., HIGH). This first transition 1202 occurs a time t1 before a HIGH-to-LOW second transition 1203 on the SCL line 808. This time t1 may be less than a threshold time t0 which is used to determine whether to adjust the first transition 1202 relative to the second transition 1203. For instance, if the time t1 is less than the threshold amount of time t0 (as illustrated in FIG. 12), then the first transition 1202 is adjusted so it occurs after the second transition 1203 (e.g., adjusted first transition 1202' on line SDAI 814 occurs after delayed second transition 1203' on line SCLI 816). On the other hand, if the first transition occurs more than the threshold amount of time t0 prior to the second transition 1203 (e.g., example illustrated in FIG. 14) or after the second transition (e.g., example illustrated in FIG. 13), then the first transition is maintained prior to or after, respectively, relative to the second transition.

Note that the threshold amount of time t0 may be defined by, for example, the line delays 810, 812 and/or the combinational circuit 804/904.

In one example, the first transition 1202 may be adjusted by a receiver circuit only when the shared bus is in use for by a second protocol distinct from a first protocol used by the device housing the receiver circuit. In other implementations, the receiver circuit may operate in both the first and second protocols.

As can be perceived, the first delay circuit 810 (FIG. 8) produces a first delayed signal SDAD 1208 while the second delay circuit 812 (FIG. 8) produces a second delayed signal SCLD 1210. The combinational circuit 904 (FIG. 9) produces a first output signal SDAI 1212 and a second output signal SCLI 1214.

Importantly, the first output signal SDAI 1212 has no transition while the second output signal SCLI 1214 is in the second logical state (e.g., HIGH). That is, an I2C compatible device may interpret the first transition 1202, while the SCL line 808 is in a HIGH state, as an I2C command/instruction (e.g., a Start or Stop condition). When the shared bus (SDA line and SCL line) is being used for a non-I2C protocol (e.g., ternary protocol) when such first transition 1202 occurs, the first transition 1202 may cause an undesirable change of state for the I2C devices that are listening/receiving on the shared bus. Consequently, by using the combinational circuit 904 and/or delay lines/circuit 810/814, an I2C device instead receives the first output signal SDAI 1212 and second output signal SCLI 1214 and does not recognize any I2C command on the shared bus lines.

Figure 13:
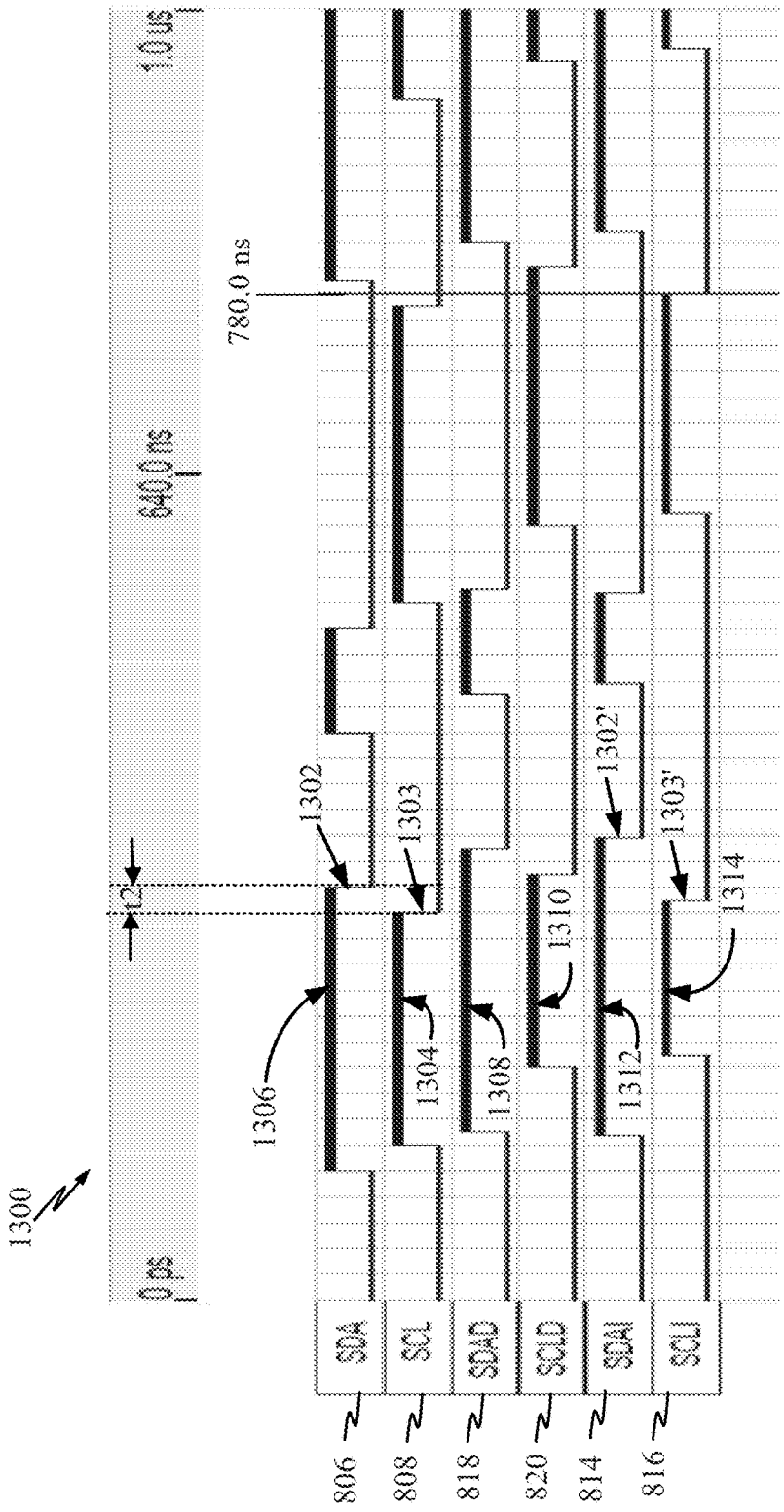
FIG. 13 illustrates a second timing diagram of the SDA line transition while the SCL line is LOW and the corresponding outputs SDAI and SCLI from the receiver circuit of FIG. 8.

FIG. 13 illustrates a second timing diagram 1300 of the SDA line 806 transition while the SCL line 808 is LOW and the corresponding outputs SDAI 814 and SCLI 816 from the receiver circuit of FIG. 8. In this example, a first signal 1306 has a first transition 1302 on the SDA line 806 that occurs while a second signal 1304 on the SCL line 808 is LOW. This first transition 1302 occurs a time t2 after a HIGH-to-LOW second transition 1303 on the SCL line 808. Since the first transition 1302 occurs after the second transition 1303, then the delayed first transition 1302' is maintained after the delayed second transition 1303'.

As can be perceived, the first delay circuit 810 (FIG. 8) produces a first delayed signal SDAD 1308 and the second delay circuit 812 (FIG. 8) produces a second delayed signal SCLD 1310. The combinational circuit 904 (FIG. 9) produces a first output signal SDAI 1312 and a second output signal SCLI 1314. Importantly, the first output signal SDAI 1312 has no transition while the second output signal SCLI 1314 is HIGH (e.g., second logical state). Consequently, the I2C device receiving the first output signal SDAI 1312 and second output signal SCLI 1314 does not recognize any I2C command on the shared bus lines.

Valid I2C protocol Start and Stop conditions may be used within the ternary mode to reset I2C devices every so often. Such Start and Stop conditions may be defined by, for example, a HIGH-to-LOW transition on the SDA line while the SCL line is HIGH. Consequently, the combinational circuit 904 (FIG. 9) should permit valid Start and/or Stop condition signals to reach I2C devices.

Figure 14:
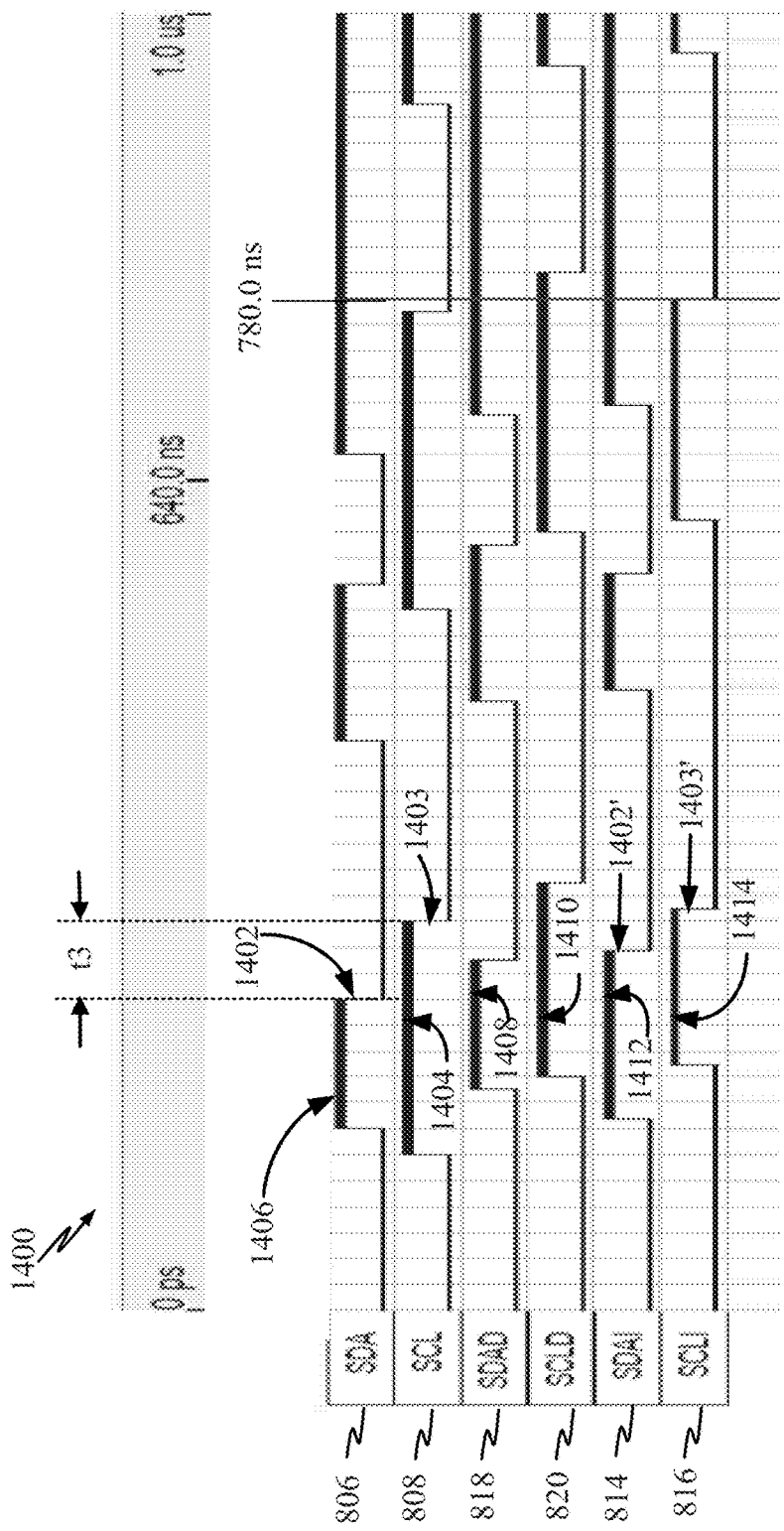
FIG. 14 illustrates a third timing diagram including an I2C Start and/or Stop condition on the SDA line and the SCL line.

FIG. 14 illustrates a third timing diagram 1400 including an I2C Start and/or Stop condition on the SDA line 806 and the SCL line 808. In this example, a first signal 1406 has a first transition 1402 on the SDA line 806 that occurs while a second signal 1404 on the SCL line 808 is LOW. As can be perceived, the first delay circuit 810 (FIG. 8) produces a first delayed signal SDAD 1408 and the second delay circuit 812 (FIG. 8) produces a second delayed signal SCLD 1410. By comparison to the first transition 1202 of FIG. 12, the first transition 1402 in FIG. 14 occurs much earlier than the first transition 1202 (FIG. 12) relative to the HIGH-to-LOW transition 1203/1403 on the SCL line 808. That is, time t3 between the HIGH-to-LOW first transition 1402 and the second transition 1403 is longer than the similar time t1 in FIG. 12. In fact, in this example, the time t3 is greater than the threshold time t0.

For instance, since the first transition 1402 occurs more than the threshold amount of time t0 prior to the second transition 1403, the delayed first transition 1402' on line SDAI 814 is maintained prior to or before the delayed second transition 1403' on line SCLI 816.

The combinational circuit 904 (FIG. 9) produces a first output signal SDAI 1412 and a second output signal SCLI 1414. Importantly, the first output signal SDAI 1412 has a delayed first transition 1402' that occurs while the second output signal SCLI 1414 is HIGH (e.g., at a second logical state and before the delayed second transition 1403'). Consequently, the I2C device receiving the first output signal SDAI 1412 and second output signal SCLI 1414 recognizes this as an I2C Start/Stop command on the shared bus lines.

In one exemplary implementation, a device is provided comprising a shared bus including a first line and a second line, a first subset of devices coupled to the shared bus, and/or a second subset of devices coupled to the shared bus. The first subset of devices may be configured to operate according to a first protocol mode over the shared bus. The second subset of devices may be configured to operate according to a second protocol mode over the shared bus, wherein the second protocol mode is distinct from the first protocol mode.

A first device, within the first subset of devices, may include a receiver circuit with line delays and a combinational logic circuit. The combinational logic circuit may be adapted to adjust a signal transition occurring on the first line while the second line is HIGH so that the signal transition instead occurs when the second line is LOW, wherein the signal transition is adjusted only if it occurs within a threshold amount of time t0 from a HIGH-to-LOW transition on the second line. In one example, the first subset of devices includes I2C-compatible devices.

The combinational logic circuit may be further adapted to provide a first delayed signal of a first signal on the first line and a second delayed signal of a second signal on the second line.

At least one of the first signal or second signal is a signal generated by one or more devices in the second subset of devices accessing the shared bus.

If the signal transition occurs more than the threshold amount of time before a HIGH-to-LOW or LOW-to-HIGH transition on the second line (as illustrated in FIG. 14), the combinational logic circuit is further adapted to maintain the signal transition on the first line while the second line is HIGH (or a second logical state).

The signal transition on the first line while the second line is HIGH is interpreted as a Start or Stop condition within the first protocol mode.

In one example, in the first protocol mode, the first line is used for data transmissions and the second line is used to transmit a clock signal. In the second protocol mode both the first line and second line are used for data transmissions encoded within symbols while a clock signal is embedded in symbol-to-symbol transitions. The first subset of devices listen on the shared bus while the second protocol mode is used on the shared bus.

A second device within the second subset of devices may be adapted to: (a) convert a sequence of data bits into a plurality of in transition numbers; (b) convert each transition number into a sequential number from a set of sequential numbers; (c) convert the sequential number into a raw symbol; and/or (d) transmit the raw symbol via a plurality of differential drivers and spread over the first line and the second line, wherein the clock signal is effectively embedded in the transmission of raw symbols since the conversion from transition number into a sequential number guarantees that no two consecutive raw symbols are the same.

An I2C-compatible device may comprise a first line delay, a second line delay, and a combinational logic circuit. The first line delay is coupled to a first line of a shared bus to delay a first signal. The second line delay is coupled to a second line of the shared bus to delay a second signal, where the second line delay is longer than the first line delay. The combinational logic circuit may be adapted to: (a) receive a first delayed signal from the first line delay and a second delayed signal from the second line delay; and/or (b) adjust a signal transition occurring on the first line while the second line is HIGH so that the signal transition instead occurs when the second line is LOW, wherein the signal transition is adjusted only if it occurs within a threshold amount of time from a second transition (i.e., HIGH-to-LOW or LOW-to-HIGH transition) on the second line.

If the signal transition occurs within the threshold amount of time from a second transition (i.e., HIGH-to-LOW or LOW-to-HIGH transition) on the second line, the combinational logic circuit may be adapted to provide a first output signal on a first output line in which the signal transition occurs while a second output signal on a second output line is LOW.

If the signal transition occurs more than the threshold amount of time prior to a second transition (e.g., HIGH-to-LOW or LOW-to-HIGH transition) on the second line while the second line is in a first state (e.g., either LOW or HIGH), the combinational logic circuit may be further adapted to provide a first output signal on a first output line in which the signal transition occurs while a second output signal on a second output line is is on the first state. For instance, if the first line (SDA) toggles or transitions outside the threshold amount of time relative to the toggling of the second line (SCL), then the combinational circuit preserves the time relationship between the two signals. That is, if the SDA line toggled or transitioned (e.g., HIGH-to-LOW or LOW-to-HIGH) while the SCL line was LOW, the same toggling or transition (e.g., at the output SDAI 814) of the SDA line will stay on the same period while the SCL line is LOW. Likewise, if the SDA line toggled or transitioned (e.g., HIGH-to-LOW or LOW-to-HIGH) while the SCL line was HIGH, the same transition of the SDA line will be kept within the HIGH period of the SCL line.

The device may transmit and/or receive according to an I2C-compatible communication protocol.

In one example, the device operates according a first protocol mode over the shared bus, where the first is used for data transmissions and the second line is used to transmit a clock signal. The signal transition on the first line while the second line is HIGH is interpreted as a Start or Stop condition in the first protocol mode. The Start and Stop conditions are transitions of the first line (i.e., SDA line) while the second line (i.e., SCL line) is HIGH. The circuit in FIGS. 8-10 preserves these conditions if a transition occurs while the second line (SCL) is HIGH but outside the threshold amount of time, more precisely inside the SCL HIGH period. Similarly, the circuit in FIGS. 8-10 does not affect the time relationship between the SDA changing and SCL state if SCL is LOW. As a result, the circuit preserves the I2C functionality of the device, while avoiding the unwanted and uncontrollable condition of the two lines switching too close from one-another, i.e. inside the threshold amount of time window.

Other devices may be coupled to the shared bus. These other devices may operate according to a second protocol mode in which both the first line and second line are used for data transmissions encoded within symbols while a clock signal is embedded in symbol-to-symbol transitions. At least one of the first signal or second signal may be a signal generated by one or more devices operating according to the second protocol mode over the shared bus. The device may listen or receive on the shared bus while the other devices operating according to the second protocol mode transmit on the shared bus.

Figure 15:
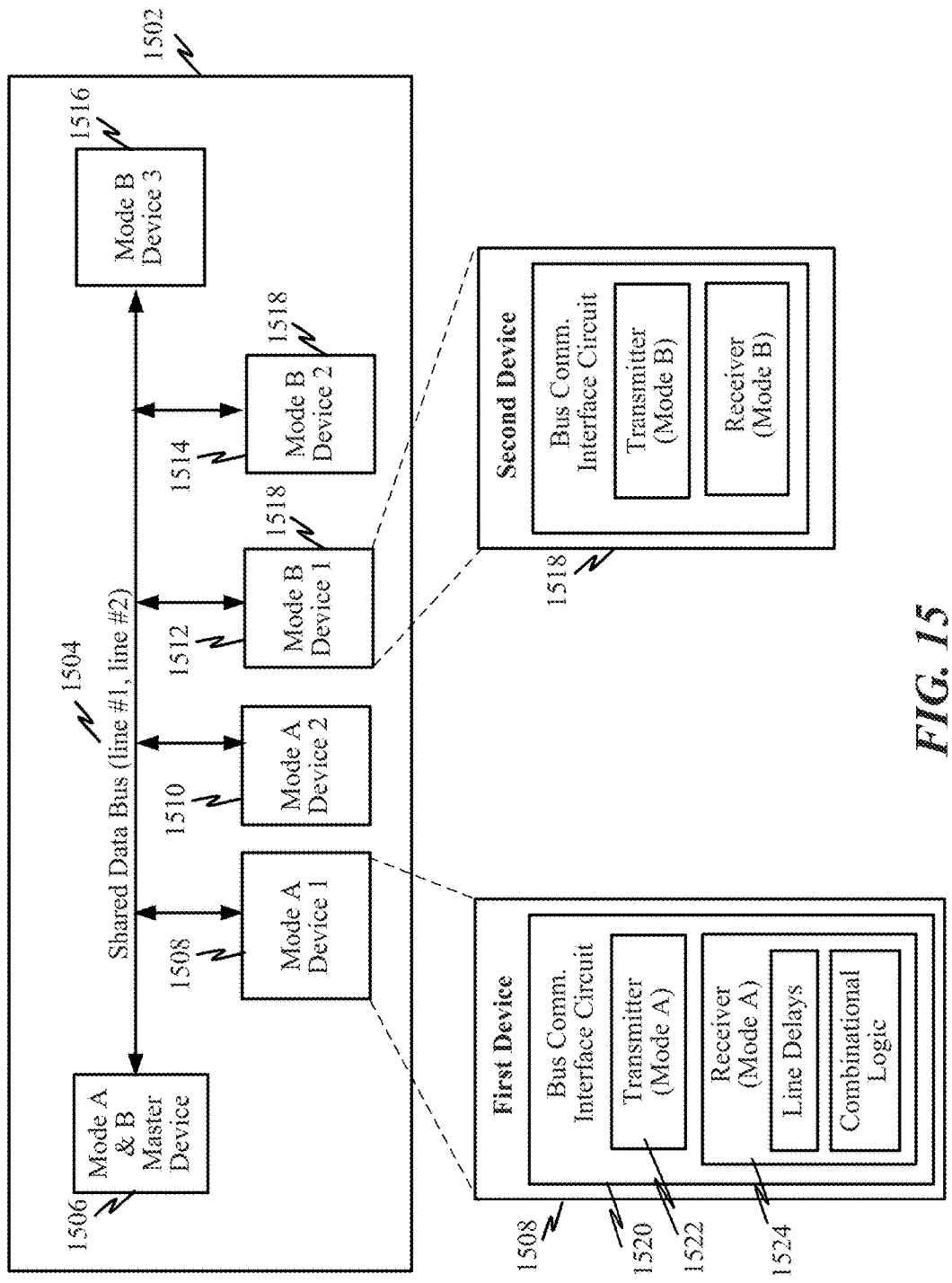
FIG. 15 is a block diagram illustrating an exemplary device configured to facilitate multi-mode operations over a shared bus.

Exemplary Device and Method Operational Therein to Facilitate Multi-Mode Operations Over a Shared Bus FIG. 15 is a block diagram illustrating an exemplary device 1502 configured to facilitate multi-mode operations over a shared bus, in one example, the device 1502 may include a shared bus 1504 (including a first line and a second line), a first subset of devices 1506, 1508, and 1510, and a second subset of devices 1506, 1518, 1520, and 1516. The first subset of devices 1506, 1508, and 1510 may be coupled to the shared bus 1504 and configured to operate according to a first protocol mode (e.g., Mode A, I2C mode, etc.) over the shared bus 1504. The second subset of devices 1506, 1518, 1520, and 1516 may also be coupled to the shared bus 1504 and configured to operate according to a second protocol mode (e.g., Mode B, ternary mode, etc.) over the shared bus 1504, wherein the second protocol mode is distinct from the first protocol mode.

In this exemplary implementation, a master device 1506 may operate according to the first protocol mode (e.g., Mode A, I2C protocol mode, etc.) and the second protocol mode (e.g., Mode B, ternary mode, etc.).

The first subset of devices may listen on the shared bus while the second protocol mode is used on the shared bus.

A first device 1508, within the first subset of devices, may include a bus communication interface circuit 1520 that implements a transmitter circuit (according to the first protocol mode or Mode A) and a receiver circuit 1524 (according to the first protocol mode or Mode A) having one or more line delays and a combinational logic circuit.

Similarly, a second device 1518 may include a bus communication interface circuit that implements a transmitter circuit (according to the second protocol mode or Mode B) and a receiver circuit (according to the second protocol mode or Mode B).

A first device 1508 or 1510 within the first subset of devices may include a receiver circuit adapted to adjust a signal transition occurring on the first line while the second line is in a first logical state (e.g., HIGH or 1) so that the signal transition instead occurs when the second line is in a second logical state (e.g., LOW or 0) opposite the first logical state, wherein the signal transition is adjusted only if it occurs within a threshold amount of time from a second transition on the second line. Note that the signal transition may occur while the shared bus is being used according to the second protocol mode (e.g., the signal transition may occur as part of signals for the second protocol mode).

In one example, the receiver circuit may include a combinational logic circuit and one or more line delays that are adapted to provide a first delayed signal of a first signal on the first line and a second delayed signal of a second signal on the second line. At least one of the first signal or second signal is a signal generated by one or more devices in the second subset of devices accessing the shared bus.

If the signal transition on the first line occurs more than the threshold amount of time from the second transition on the second line while the second line is in a first state, the receiver circuit is further adapted to maintain the signal transition on the first line while the second line is in the first state.

In one example the signal transition on the first line while the second line is the first logical state may be interpreted as a Start or Stop condition within the first protocol mode if the transition occurs more than a threshold amount of time from the second transition on the second line.

In one example, in the first protocol mode the first line is used for data transmissions and the second line is used to transmit a clock signal. In the second protocol mode both the first line and second line may be used the data transmissions encoded within symbols while a clock signal is embedded in symbol-to-symbol transitions.

The first subset of devices may include I2C-compatible devices. In one example, a second device within the second subset of devices is adapted to: (a) convert a sequence of data bits into a plurality of m transition numbers, (b) convert each transition number into a sequential number from a set of sequential numbers, (c) convert the sequential number into a raw symbol, and/or (d) transmit the raw symbol via a plurality of differential drivers and spread over the first line and the second line, wherein the clock signal is effectively embedded in the transmission of raw symbols since the conversion from transition number into a sequential number guarantees that no two consecutive raw symbols are the same.

Figure 16:
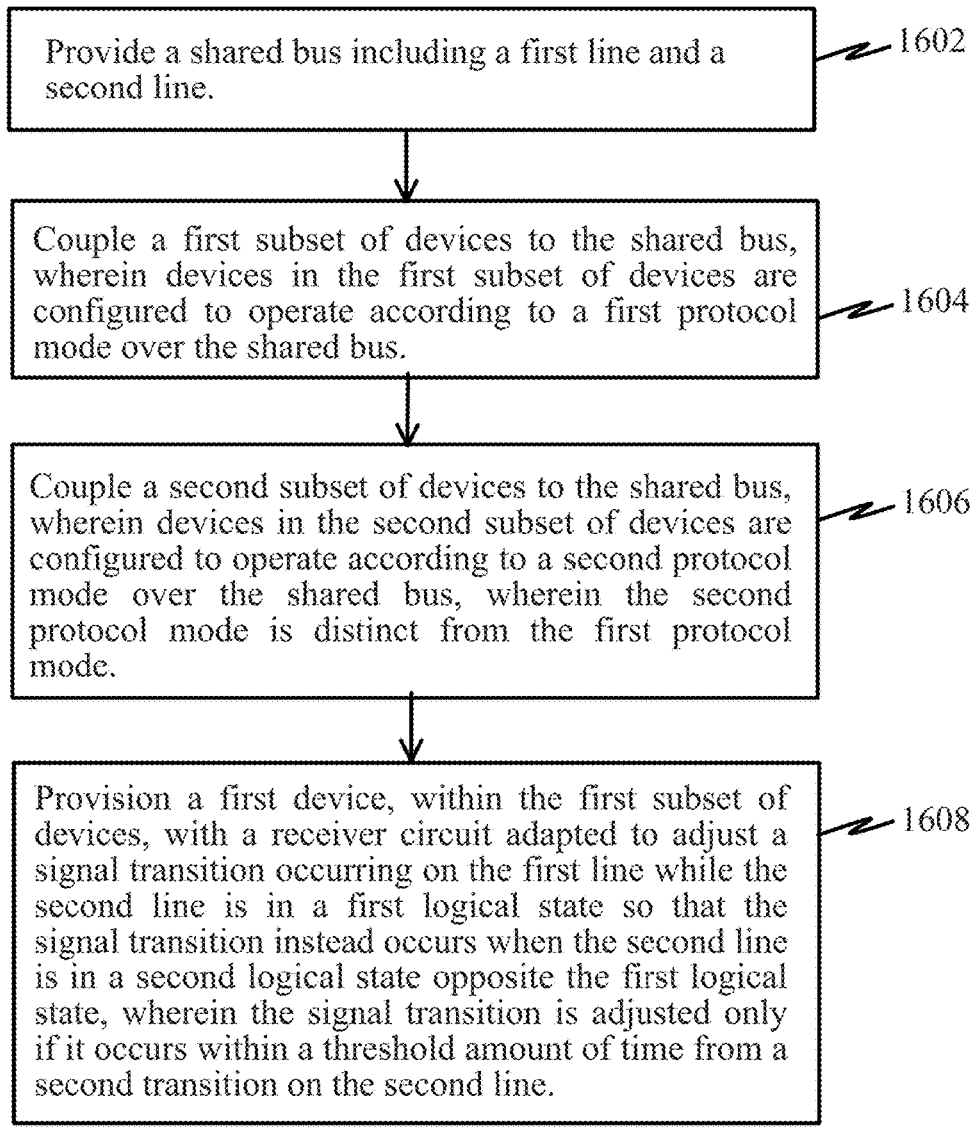
FIG. 16 illustrates a method operational to facilitate multi-mode operations over a shared bus.

FIG. 16 illustrates a method operational to facilitate multi-mode operations over a shared bus. A shared bus including a first line and a second line is provisioned or provided 1602.

A first subset of devices are coupled to the shared bus, wherein devices in the first subset of devices are configured to operate according to a first protocol mode over the shared bus 1604.

A second subset of devices are coupled to the shared bus, wherein devices in the second subset of devices are configured to operate according to a second protocol mode over the shared bus, wherein the second protocol mode is distinct from the first protocol mode 1606.

A first device, within the first subset of devices, is provisioned with or includes a receiver circuit adapted to adjust a signal transition occurring on the first line while the second line is in a first logical state so that the signal transition instead occurs when the second line is in a second logical state opposite the first logical state, wherein the signal transition is adjusted only if it occurs within a threshold amount of time from a second transition on the second line 1608.

Exemplary Receiver Circuit and Method Operational Therein

Figure 17:
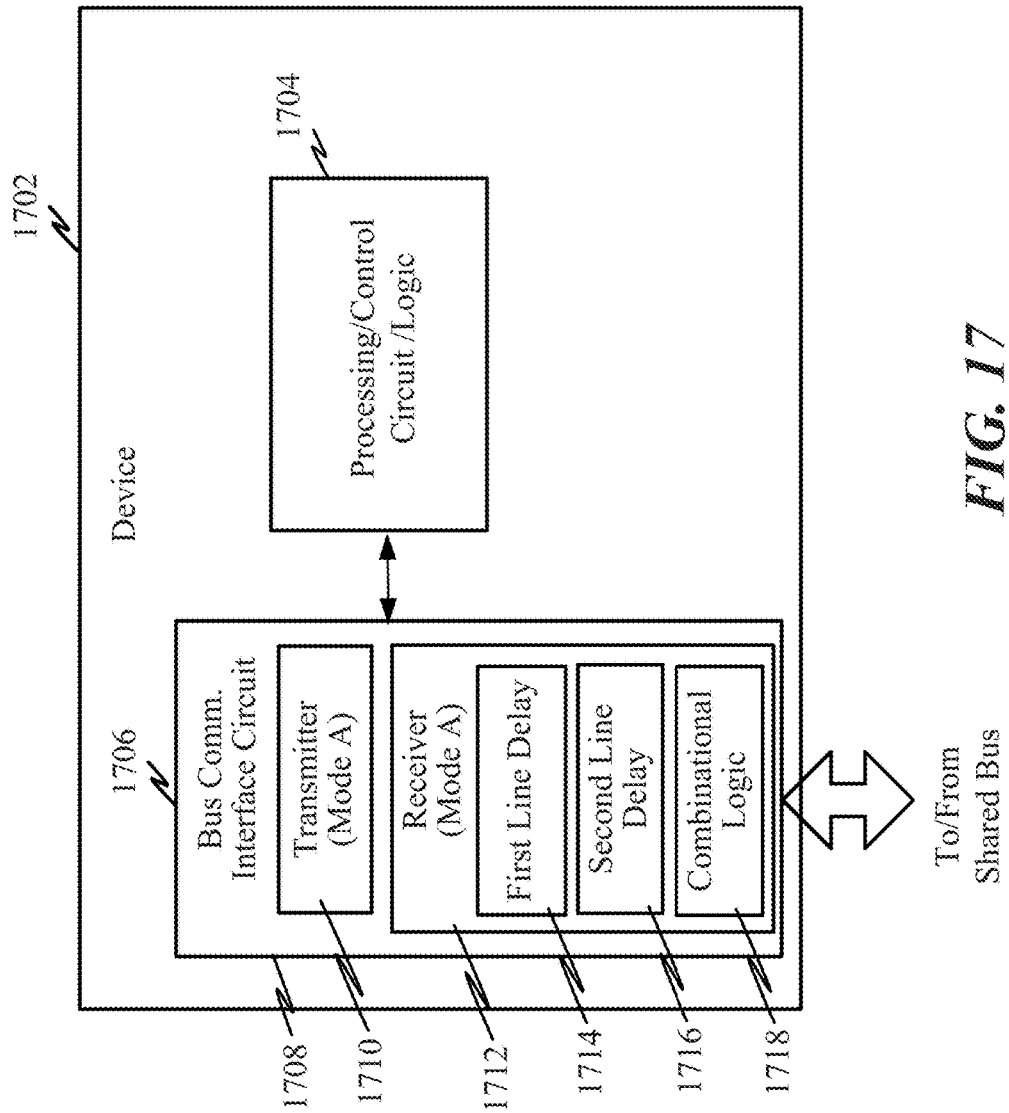
FIG. 17 is a block diagram illustrating an exemplary receiver configure to dynamically adjust certain signal transitions to accommodate a multi-mode operation over a shared bus.

FIG. 17 is a block diagram illustrating an exemplary receiver configure to dynamically adjust certain signal transitions to accommodate a multi-mode operation over a shared bus.

The device 1702 may include a processing/control circuit or logic 1702 coupled to a bus communication interface circuit 1706. The bus communication interface circuit 1706 may include a transmitter 1710 and a receiver 1712 that operates according to the first mode of operation (e.g., Mode A or I2C-compatible mode).

The receiver 1712 may include a first line delay to couple to a first line of a shared bus to delay a first signal. The receiver may also include a second line delay to couple to a second line of the shared bus to delay a second signal, where the second line delay is longer than the first line delay.

A combinational logic circuit 1718, within the receiver 1712, may be adapted to: (a) receive a first delayed signal from the first line delay and a second delayed signal from the second line delay; and/or (b) adjust a signal transition occurring on the first line while the second line is in a first logical state so that the signal transition instead occurs when the second line is in a second logical state, wherein the signal transition is adjusted only if it occurs within a threshold amount of time from a second transition on the second line.

If the signal transition occurs within the threshold amount of time from the second transition on the second line and the second line is the first logical state, the combinational logic circuit may be adapted to provide a first output signal on a first output line in which the signal transition occurs while a second output signal on a second output line is in the second logical state.

If the signal transition on the first line occurs more than the threshold amount of time from the second transition on the second line while the second line is in the first state, the combinational logic circuit is further adapted to maintain the signal transition on the first line while the second line is in the first state.

The device may operate according a first protocol mode over the shared bus, where the first line is used for data transmissions and the second line is used to transmit a clock signal.

The signal transition on the first line while the second line is in the first logical state is interpreted as a Start or Stop condition within the first protocol mode if the transition occurs more than a threshold amount of time from a second transition on the second line.

Other devices coupled to the shared bus may operate according to a second protocol mode in which both the first line and second line are used for data transmissions encoded within symbols while a clock signal is embedded in symbol-to-symbol transitions.

At least one of the first signal or second signal is a signal generated by one or more devices operating according to the second protocol mode over the shared bus.

The device listens on the shared bus while the other devices operating according to the second protocol mode transmit on the shared bus.

The device transmits and receives according to an I2C-compatible communication protocol.

Figure 18:
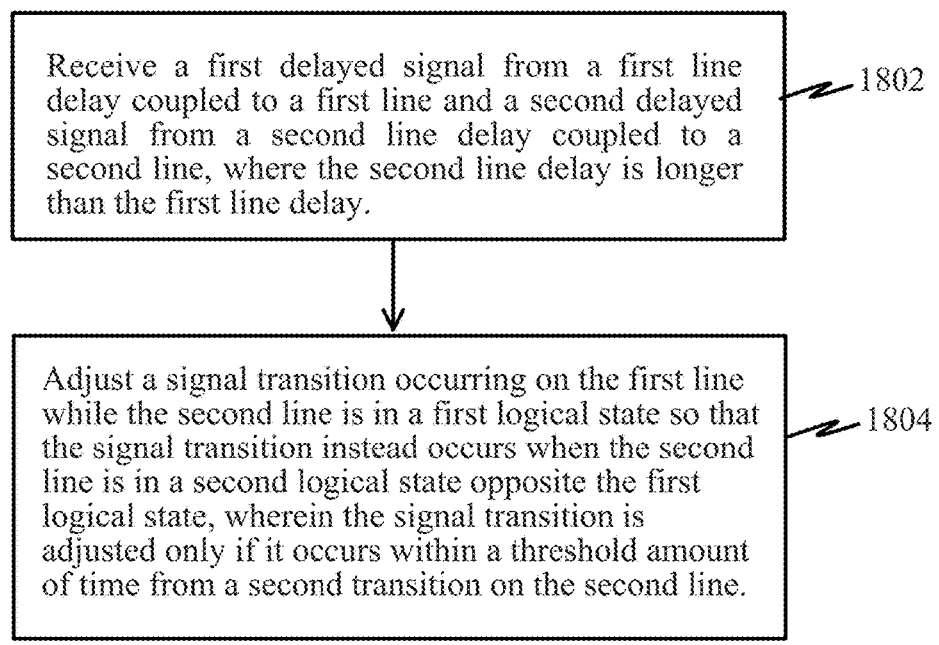
FIG. 18 illustrates an exemplary method operational on a receiver device.

FIG. 18 illustrates an exemplary method operational on a receiver device. A first delayed signal may be received from a first line delay coupled to a first line and a second delayed signal from a second line delay coupled to a second line, where the second line delay is longer than the first line delay 1802.

A signal transition occurring on the first line while the second line is in a first logical state may be adjusted so that the signal transition instead occurs when the second line is in a second logical state opposite the first logical state, wherein the signal transition is adjusted only if it occurs within a threshold amount of time from a second transition on the second line 1804.

In the first protocol mode the first line is used for data transmissions and the second line is used to transmit a clock signal, and in the second protocol mode both the first line and second line are used for data transmissions encoded within symbols while a clock signal is embedded in symbol-to-symbol transitions.

One or more of the components, steps, features, and/or functions illustrated in the Figures may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in the Figures may be configured to perform one or more of the methods, features, or steps described in the Figures. The novel algorithms described herein may also be efficiently implemented in software and/or embedded in hardware.

In addition, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc.

When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels and various other mediums capable of storing, containing, or carrying instruction(s) and/or data.

Furthermore, embodiments may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A device, comprising:
   a shared bus including a first line and a second line;
   a first subset of devices coupled to the shared bus and configured to operate according to a first protocol mode over the shared bus;
   a second subset of devices coupled to the shared bus and configured to operate according to a second protocol mode over the shared bus, wherein the second protocol mode is distinct from the first protocol mode; and
   a first device within the first subset of devices, the first device including a receiver circuit adapted to adjust a signal transition occurring on the first line while the second line is in a first logical state so that the signal transition instead occurs when the second line is in a second logical state opposite the first logical state, wherein the signal transition is adjusted only if it occurs within a threshold amount of time from a second transition on the second line,
   wherein a second device within the second subset of devices is adapted to:
      convert a sequence of data bits into a plurality of m transition numbers;
      convert each transition number into a sequential number from a set of sequential numbers;
      convert the sequential number into a symbol; and
      transmit the symbol via a plurality of differential drivers and spread over the first line and the second line, wherein clock information is effectively embedded in the transmission of symbols since the conversion from transition number into a sequential number guarantees that no two consecutive symbols are the same.

2. The device of claim 1, wherein the receiver circuit includes a combinational logic circuit and one or more line delays that are adapted to provide a first delayed signal of a first signal on the first line and a second delayed signal of a second signal on the second line.

3. The device of claim 2, wherein at least one of the first signal or the second signal is a signal generated by one or more devices in the second subset of devices accessing the shared bus.

4. The device of claim 2, wherein at least one of the first signal or the second signal is a signal generated while the shared bus is operating according to the second protocol mode.

5. The device of claim 1, wherein if the signal transition on the first line occurs more than the threshold amount of time from the second transition on the second line while the second line is in the second logical state, the receiver circuit is further adapted to maintain the signal transition on the first line while the second line is in the second logical state.

6. The device of claim 1, wherein the signal transition on the first line while the second line is the first logical state is interpreted as a Start or Stop condition within the first protocol mode if the signal transition occurs more than a threshold amount of time from the second transition on the second line.

7. The device of claim 1, wherein the first protocol mode the first line is used for data transmissions and the second line is used to transmit a clock signal.

8. The device of claim 1, wherein the second protocol mode both the first line and the second line are used for data transmissions encoded within symbols while a clock signal is embedded in symbol-to-symbol transitions.

9. The device of claim 1, wherein the first subset of devices listen on the shared bus while the second protocol mode is used on the shared bus.

10. The device of claim 1, wherein the first subset of devices includes I2C-compatible devices.

11. The device of claim 1, wherein the sequential number is converted into a raw symbol.

12. A method operational on a device, comprising:
providing a shared bus including a first line and a second line;
coupling a first subset of devices to the shared bus, wherein devices in the first subset of devices are configured to operate according to a first protocol mode over the shared bus;
coupling a second subset of devices to the shared bus, wherein devices in the second subset of devices are configured to operate according to a second protocol mode over the shared bus, wherein the second protocol mode is distinct from the first protocol mode; and
provisioning a first device, within the first subset of devices, with a receiver circuit adapted to adjust a signal transition occurring on the first line while the second line is in a first logical state so that the signal transition instead occurs when the second line is in a second logical state opposite the first logical state, wherein the signal transition is adjusted only if it occurs within a threshold amount of time from a second transition on the second line,
wherein a second device within the second subset of devices is adapted to:
convert a sequence of data bits into a plurality of m transition numbers;
convert each transition number into a sequential number from a set of sequential numbers;
convert the sequential number into a symbol; and
transmit the symbol via a plurality of differential drivers and spread over the first line and the second line, wherein clock information is effectively embedded in the transmission of symbols since the conversion from transition number into a sequential number guarantees that no two consecutive symbols are the same.

13. The method of claim 12, wherein the receiver circuit includes a combinational logic circuit and one or more line delays that are adapted to provide a first delayed signal of a first signal on the first line and a second delayed signal of a second signal on the second line.

14. The method of claim 13, wherein the one or more line delays include a first line delay coupled to the first line and a second line delay coupled to the second line, where the second line delay is longer than the first line delay.

15. The method of claim 13, wherein at least one of the first signal or second signal is a signal generated by one or more devices in the second subset of devices accessing the shared bus.

16. The method of claim 12, wherein if the signal transition on the first line occurs more than the threshold amount of time from the second transition on the second line while the second line is in the second logical state, the receiver circuit is further adapted to maintain the signal transition on the first line while the second line is in the second logical state.

17. The method of claim 12, wherein the first protocol mode the first line is used for data transmissions and the second line is used to transmit a clock signal.

18. The method of claim 12, wherein the second protocol mode both the first line and second line are used for data transmissions encoded within symbols while a clock signal is embedded in symbol-to-symbol transitions.

19. The method of claim 12, wherein the first subset of devices listen on the shared bus while the second protocol mode is used on the shared bus.

20. A device, comprising:
a first line delay to couple to a first line of a shared bus to delay a first signal;
a second line delay to couple to a second line of the shared bus to delay a second signal, where the second line delay is longer than the first line delay; and
a combinational logic circuit adapted to:
(a) receive a first delayed signal from the first line delay and a second delayed signal from the second line delay; and
(b) adjust a signal transition occurring on the first line while the second line is in a first logical state so that the signal transition instead occurs when the second line is in a second logical state, wherein the signal transition is adjusted only if it occurs within a threshold amount of time from a second transition on the second line,
wherein other devices coupled to the shared bus operate according to a second protocol mode in which both the first line and the second line are used for data transmissions encoded within symbols while clock information is embedded in symbol-to-symbol transitions, and
wherein at least one of the other devices coupled to the shared bus is adapted to:
convert a sequence of data bits into a plurality of m transition numbers;
convert each transition number into a sequential number from a set of sequential numbers;
convert the sequential number into a symbol; and
transmit the symbol via a plurality of differential drivers and spread over the first line and the second line, wherein the clock signal is effectively embedded in the symbol-to-symbol transitions since the conversion from transition number into a sequential number guarantees that no two consecutive symbols are the same.

21. The device of claim 20, wherein if the signal transition occurs within the threshold amount of time from the second transition on the second line and the second line is the first logical state, the combinational logic circuit is adapted to provide a first output signal on a first output line in which the signal transition occurs while a second output signal on a second output line is in the second logical state.

22. The device of claim 20, wherein if the signal transition on the first line occurs more than the threshold amount of time from the second transition on the second line while the second line is in the second logical state, the combinational logic circuit is further adapted to maintain the signal transition on the first line while the second line is in the second logical state.

23. The device of claim 20, wherein the device operates according a first protocol mode over the shared bus, where the first line is used for data transmissions and the second line is used to transmit a clock signal.

24. The device of claim 23, wherein the signal transition on the first line while the second line is the first logical state is interpreted as a Start or Stop condition within the first protocol mode if the signal transition occurs more than a threshold amount of time from a second transition on the second line.

25. The device of claim 23, wherein at least one of the first signal or second signal is a signal generated by one or more devices operating according to the second protocol mode over the shared bus.

26. The device of claim 23, wherein the device listens on the shared bus while the other devices operating according to the second protocol mode transmit on the shared bus.

27. The device of claim 20, wherein the device transmits and receives according to an I2C-compatible communication protocol.

28. A method operational on a receiver device coupled to a shared bus operative in a first protocol and in a second protocol, comprising:
    receiving a first delayed signal from a first line delay coupled to a first line and a second delayed signal from a second line delay coupled to the second line, where the second line delay is longer than the first line delay; and
    adjusting a signal transition occurring on the first line while the second line is in a first logical state so that the signal transition instead occurs when the second line is in a second logical state opposite the first logical state, wherein the signal transition is adjusted only if it occurs within a threshold amount of time from a second transition on the second line,
    wherein another device coupled to the shared bus is adapted to:
        convert a sequence of data bits into a plurality of m transition numbers;
        convert each transition number into a sequential number from a set of sequential numbers;
        convert the sequential number into a symbol; and
        transmit the symbol via a plurality of differential drivers and spread over the first line and the second line, wherein clock information is effectively embedded in the transmission of symbols since the conversion from transition number into a sequential number guarantees that no two consecutive symbols are the same.

29. The method of claim 28, wherein in the first protocol mode the first line is used for data transmissions and the second line is used to transmit a clock signal, and in the second protocol mode both the first line and the second line are used for data transmissions encoded within symbols while a clock signal is embedded in symbol-to-symbol transitions.

* * * * *